(12) United States Patent
Matsushita et al.

(10) Patent No.: US 6,801,663 B2
(45) Date of Patent: Oct. 5, 2004

(54) METHOD AND APPARATUS FOR PRODUCING COMMUNICATION DATA, METHOD AND APPARATUS FOR REPRODUCING COMMUNICATION DATA, AND PROGRAM STORAGE MEDIUM

(75) Inventors: Nobuyuki Matsushita, Kanagawa (JP); Yuji Ayatsuka, Tokyo (JP); Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 598 days.

(21) Appl. No.: 09/793,266

(22) Filed: Feb. 26, 2001

(65) Prior Publication Data

US 2003/0038884 A1 Feb. 27, 2003

(30) Foreign Application Priority Data

Feb. 25, 2000 (JP) .................................... P2000-049931

(51) Int. Cl.[7] .............................. G06K 9/36; H04N 7/14
(52) U.S. Cl. ....................... 382/236; 348/14.1; 348/700
(58) Field of Search ................................ 382/103, 107, 382/232, 236, 305, 235, 229; 345/2.2, 418, 547; 348/14.1, 374, 402.1, 699, 700; 379/93.14, 93.21; D14/130

(56) References Cited

U.S. PATENT DOCUMENTS

| 5,117,287 A | * | 5/1992 | Koike et al. ............. 348/402.1 |
| 5,299,125 A | * | 3/1994 | Baker et al. .................... 704/9 |
| 5,508,713 A | * | 4/1996 | Okouchi ..................... 345/2.2 |
| 5,642,135 A | * | 6/1997 | Noguchi et al. ............ 345/547 |
| 5,677,993 A | * | 10/1997 | Ohga et al. ................. 704/257 |
| 5,884,247 A | * | 3/1999 | Christy .......................... 704/7 |
| 5,918,222 A | * | 6/1999 | Fukui et al. ................... 707/1 |
| 6,256,400 B1 | * | 7/2001 | Takata et al. ............... 382/103 |
| 6,615,172 B1 | * | 9/2003 | Bennett et al. ............ 704/257 |

OTHER PUBLICATIONS

Chen et al., Extraction of High–Resolution Video Stills from MPEG Image Sequences, IEEE 1998, University of North Dakota, pp. 465–469.*

Wallace et al., "Subjective Testing Results for Still Picture Compression Algorithms for International Standardization", Digital Equipment Corporation, IEEE 1998, pp. 1022–1027.*

\* cited by examiner

Primary Examiner—Jayanti K. Patel
(74) Attorney, Agent, or Firm—Jay H. Maioli

(57) ABSTRACT

Communication data including actually-photographed pictures is provided. The communication data consists of text data such as a sentence input by a user and a plurality of still pictures obtained by taking a picture of the user a plurality of times. Because the communication data includes visual information provided by a picture of a user, the communication data can more stimulate a user who receives the communication data than text-base communication data can. Furthermore, it is possible to represent a motion using a plurality of still pictures thereby transmitting a large amount of information. Because the motion is represented using only a plurality of still pictures, the data size is much smaller than is required to represent a motion using a moving picture.

19 Claims, 18 Drawing Sheets

METHOD AND APPARATUS FOR PRODUCING COMMUNICATION DATA, METHOD AND APPARATUS FOR REPRODUCING COMMUNICATION DATA, AND PROGRAM STORAGE MEDIUM

BACKGROUND OF THE INVENTION

1. Field of the Invention

The present invention relates to a technique of producing and displaying communication data including an actually photographed picture of a user, and more particularly, to a communication data producing and displaying technique which allow an actually photographed picture to be attached with data without encountering a problem with the data size and without making a user nervous.

The present invention also relates to a conversation supporting system/method implemented and provided on a computer network such as the Internet, for supporting a virtual conversation such as a chat in which a plurality of users are allowed to participate, and more particularly, to a conversation supporting system/method for supporting a remote conversation in which actually-photographed pictures of respective users are provided without encountering a problem of a high load imposed upon the network or without imposing a psychological pressure upon the users.

2. Description of the Related Art

In recent years, dramatically great advances have been achieved in information processing, information communication, and computing technologies, and computer systems are now used everywhere. The need for a more advanced networking technique for connecting computers to each other is becoming increasingly strong. When computers are connected to each other via a network, users of computers can share computer resources and can distribute, exchange, and share information among users in a very efficient manner. Furthermore, cooperative jobs are possible among computers connected to each other via a network.

A wide variety of networking techniques are used to connect computers to each other. They include a LAN (Local Area Network) such as Ethernet and Bluetooth installed in a local area, a WAN (Wide Area Network) which connects LANs via a dedicated line or the like, and the Internet which has grown to a world-wide network system after a great number of networks have been connected from one to another.

At present, a huge number of servers are distributed on the Internet, and various information resources such as HTML documents are available via the Internet with or without cost. By specifying an identifier called a URL (Uniform Resource Locator), clients can access any of these information resources open to the public according to the TCP/IP protocol.

There is a tendency toward the use of a network such as the Internet not only to simply distribute information but also to realize real-time remote communication. Specific examples of applications to such remote communication include a BBS (Bulletin Board System) and a chat system.

The BBS is a system in which computerized bulletin information is collected and stored on servers on a network and is provided to users via the network. The BBS has the advantage that information can be managed by servers in a unified fashion and information can be transmitted at real time among users at various remote locations in a wide area.

The chat is an on-line talk performed in real time on a network by users to input characters via keyboards. In general, a plurality of users logging in a chat can talk on a real-time basis, and the contents of talks of the respective users are displayed on monitor screens of all participants. The chat allows users at various remote locations to enjoy real-time talks or discussions in a virtual world build on the Internet. An attractive advantage of the chat system is that any user can participate in a chat simply by logging in the virtual world provided by the chat system and they are not necessarily needed to be acquaintances to each other in the real world. In the chat, in contrast to the e-mail and the BBS in which interactions are performed in an asynchronous fashion, talks are performed in a synchronous fashion such that a string of characters input by a user logging in the chat is immediately transmitted to the other users. The chat is exciting in that user can immediately receive a response from another user and can input a next sentence depending upon the received response. In the chat, unlike e-mails in which rather long sentences are transmitted, sentences transmitted are usually short.

IRC (Internet Relay Chat) is an example of a known server-client system for realizing a real-time conference or chat on the Internet. The IRC protocol used in IRC is defined in the RFC (Request For Comments) 1459 standard.

It is also known in the art to realize real-time communication by transmitting audio and video data (moving picture, for example) produced via a video camera over a network. In such a two-way communication system, one-to-one connections are usually employed as in a television conference system or a video conference system. However, in some two-way communication systems, as in "CU-See Me" developed at Cornell University, USA, communication is performed among a plurality of users in the form of a chat using a plurality of media such as a video and audio media.

In communication, if video pictures are used in addition to words, expressions of faces of respective users are transmitted, and enhanced feelings of presence can be obtained. However, transmission of video data via a network has the following problems.

(1) Video data generally has a large size, and thus video data needs wide bandwidth in transmission via a network.

(2) A picture of a user is always taken by a camera during communication, and thus a high psychological pressure is imposed upon the user. This limits the situation in which the system is used.

(3) Because a picture and a voice are transmitted on a real-time basis, it is difficult to see (or listen to) data received at some previous time while grasping the current status.

In a chat system called "Microsoft Chat" available from Microsoft Corporation, USA, a cartoon character for providing additional information in addition to text information is assigned to each user, wherein each cartoon character can have different face expressions. Cartoon characters assigned to respective users are displayed in an array of frames on a browser screen, and a text input by a user is displayed in a speech balloon of a corresponding cartoon character. In this chat system, unlike the system in which video data is transmitted, the problem of use of a wide bandwidth in transmission over a network does not occur. However, cartoon characters are less expressive than video pictures. Besides, cartoon characters cannot be easily accepted in applications, such as a conference, for use in companies.

SUMMARY OF THE INVENTION

It is an object of the present invention to provide a technique of producing and displaying communication data including an actually-photographed picture of a user.

It is another aspect of the present invention to provide a technique of producing and displaying communication data, capable of attaching an actually-photographed picture without having a problem in terms of the data size and without imposing a psychological pressure upon the user.

It is still another aspect of the present invention to provide a conversation supporting system/method implemented and provided on a computer network such as the Internet, for supporting a virtual conversation such as a chat in which a plurality of users are allowed to participate.

It is still another aspect of the present invention to provide a conversation supporting system/method for supporting a remote conversation in which actually photographed pictures of respective users are provided without encountering a problem of a high load imposed upon the network or without imposing a psychological pressure upon the users.

According to a first aspect of the present invention, to achieve the above objects, there is provided a communication data producing apparatus/method for producing communication data including an actually-photographed picture, the communication data producing apparatus/method comprising: a sentence inputting unit/step for inputting, by a user, a sentence or a statement; an imaging unit/step for taking a picture of the user a plurality of times in a predetermined period of time; a processing unit/step for producing communication data including the sentence or the statement input via/in the sentence inputting unit/step and the plurality of pictures taken by/in the imaging unit/step.

In the present invention, communication data includes text data such as a sentence input by a user and a plurality of still pictures of the user taken at particular intervals of time. Because the communication data includes visual information provided by a picture of a user, the communication data can more stimulate a user who receives the communication data than text-base communication data can. Furthermore, by representing a motion using a plurality of still pictures, it is possible to transmit a similar amount of information as can be transmitted by a moving picture.

Because the motion is represented using only a plurality of still pictures, the data size is much smaller than is required to represent a motion using a moving picture. This allows a reduction in a transmission load or a storage load. Furthermore, because a picture of a user is not always taken, a less psychological pressure is imposed upon the user.

In a communication data reproducing apparatus, an input sentence is always displayed on a browser screen and a picture is switched from time to time so as to provide an expressive picture having a motion to a user. Instead of switching the picture at fixed intervals of time, the picture may be switched at random intervals determined using random numbers or the like so that an unpredictable motion is provided using only still pictures thereby making the picture look like a moving picture. In a communication data producing apparatus, for example, if a user makes a motion such as a gesture when a picture is taken, a greater amount of information is embedded in communication data.

Preferably, in the communication data producing apparatus/method according to the first aspect of the present invention, in response to an operation performed by the user to input a sentence or a statement via/in the sentence inputting unit/step, the processing unit/step starts taking a plurality of pictures using/in the imaging unit/step and produces communication data.

The communication data producing apparatus/method according to the first aspect of the present invention may further comprise an indicator/indicating step for indicating to the user the timings of the respective pictures taken by the imaging unit/step, so that in response to the indication, the user may form a particular expression on his/her face or making a gesture or performance.

The communication data producing apparatus/method may further comprise a sentence analyzer/analyzing step for analyzing the sentence input via/in the sentence inputting unit/step and an image processing unit/step for processing a picture taken by/in the imaging unit/step, in accordance with the result of analysis performed by/in the sentence analyzer/analyzing step.

In the sentence analyzer/analyzing step, a mark such as an exclamation mark, a question mark and a face mark or an escape sequence may be extracted from the sentence input in the sentence inputting unit/step and the meaning or intention of the sentence may be determined on the basis of the extracted mark in addition to a result of analysis of a word or an expression in the input sentence.

The image processing unit/step may perform synthesis and/or modification, such as setting of a background, adjustment of lightness, luminance, and contrast, superimposing upon a CG image, conversion by means of synthesis into a sepia-color form, oil-painting-like form, watercolor-painting-like form, or mosaic form, and/or positive-to-negative reversion, upon a picture depending upon a feeling of a user or the purpose of a sentence detected as a result of the sentence analysis performed by the sentence analyzer.

The sentence inputting unit/step may accept an input of a mark or an escape sequence indicating the meaning or intention of the input sentence.

The communication data producing apparatus/unit may further comprise a communication unit for transferring produced communication data to the outside of the communication data producing apparatus.

The communication data producing apparatus/method may further comprise a data storage unit/step for storing produced communication data.

The communication data producing apparatus/method may further comprise a user location registration unit/step for registering a set of location information and a user identifier for each of a plurality of users; and a driving unit/step for moving an imaging area of/in the imaging unit/step to a specified location, wherein in response to an operation performed by a user to input a sentence via/in the sentence inputting unit/step, the processing unit/step may acquire location information associated with the user by issuing a query to/in about the user location registration unit/step and may move, using/in the driving unit/step, the imaging area of/in the imaging unit/step in accordance with the acquired location information, and the processing unit/step may produce communication data including the sentence or statement input via/in the sentence inputting unit/step and a plurality of pictures taken by/in the imaging unit/step.

The user location registration unit may be connected to a main unit of the communication data producing apparatus via a network. Herein, a plurality of user location registration units may be employed so that user location information may be managed in a distributed fashion.

According to a second aspect of the present invention, there is provided a communication data reproducing apparatus/method for reproducing communication data including sentence data and a plurality of image data, the communication data reproducing apparatus/method comprising: a display unit including a display screen (in the case of the communication data reproducing apparatus); and a display controller/controlling step for setting a frame for displaying communication data therein on the display screen and displaying, in the frame, a sentence and one of a plurality of pictures contained in communication data.

Preferably, the communication data reproducing apparatus/method according to the second aspect of the present invention further comprises a communication unit/step for receiving communication data from the outside.

The communication data reproducing apparatus/method according to the second aspect of the present invention may further comprise a data storage unit/step for storing a plurality of communication data.

The display controller/controlling step may switch the picture displayed in the frame at arbitrary or predetermined intervals of time.

The display controller/controlling step may allocate a plurality of frames for displaying respective plural communication data on the display screen such that a plurality of communication data are displayed on the single screen so that a user can see the data at a glance. This technique allows a plurality of users to communicate with one another. In this case, the respective frames may be allocated such that they have different horizontal or vertical sizes and/or they are disposed at different locations on the screen in accordance with the order of time.

According to a third aspect of the present invention, there is provided a program storage medium on which a software program is stored in a computer-readable form, the software program describing, in a computer language, a process of producing communication data including an actually-photographed picture, the software program comprising: a sentence inputting step in which a user inputs a sentence or a statement; an imaging step in which a picture of the user is taken a plurality of times in a predetermined period of time; and a processing step in which communication data, including the sentence or the statement input in the sentence inputting step and the plurality of pictures taken in the imaging step, is produced.

According to a fourth aspect of the present invention, there is provided a program storage medium on which a software program is stored in a computer-readable form, the software program describing, in a computer language, a process of reproducing communication data including sentence data and an actually-photographed picture on a display screen, the software program comprising a display controlling step in which a frame for displaying communication data therein is set on the display screen, and a sentence and one of a plurality of pictures contained in communication data are displayed in the frame.

The computer-readable storage medium according to the third or fourth aspect of the present invention may be, for example, a medium used to provide a computer program in a computer readable form to a general-purpose computer system having the capability of executing various program codes. A specific example of such a medium is a removable and portable storage medium such as a CD (Compact Disc), an FD (Floppy Disc), and an MO (Magneto-Optical disc). Alternatively, the computer program may be supplied to a particular computer system via a transmission medium such as a network (in the form of either a wireless network or a cable network).

The program storage medium defines a cooperative relationship in structure or function, for realizing a function of a particular computer program on a computer system, between the computer program and the storage medium. In other words, by installing a particular computer program onto a computer system via a program storage medium according to the third or fourth aspect of the present invention, it is possible to implement cooperative functions on the computer system so as to realize functions similar to those realized by the first or second aspect of the present invention.

These and other objects and features of the present invention will become more apparent from the following detailed description of embodiments with reference to the accompanying drawings.

DESCRIPTION OF THE PREFERRED EMBODIMENTS

The present invention is described in further detail below with reference to embodiments in conjunction with the accompanying drawings.

1. Communication Data Producing System

Figure 1:
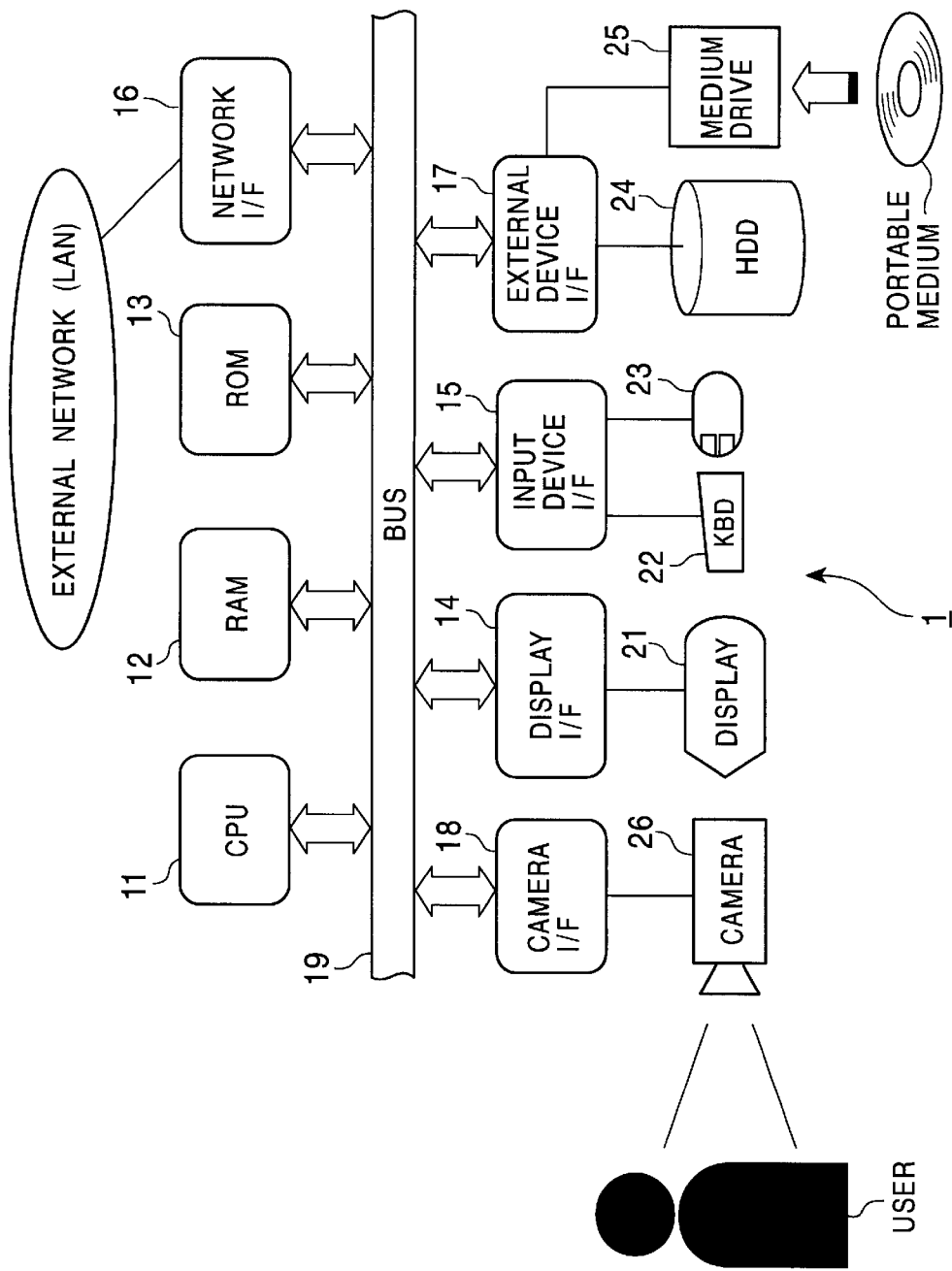
FIG. 1 is a schematic diagram illustrating an example of a configuration of a communication data producing system according to an embodiment of the present invention.
Figure 2:
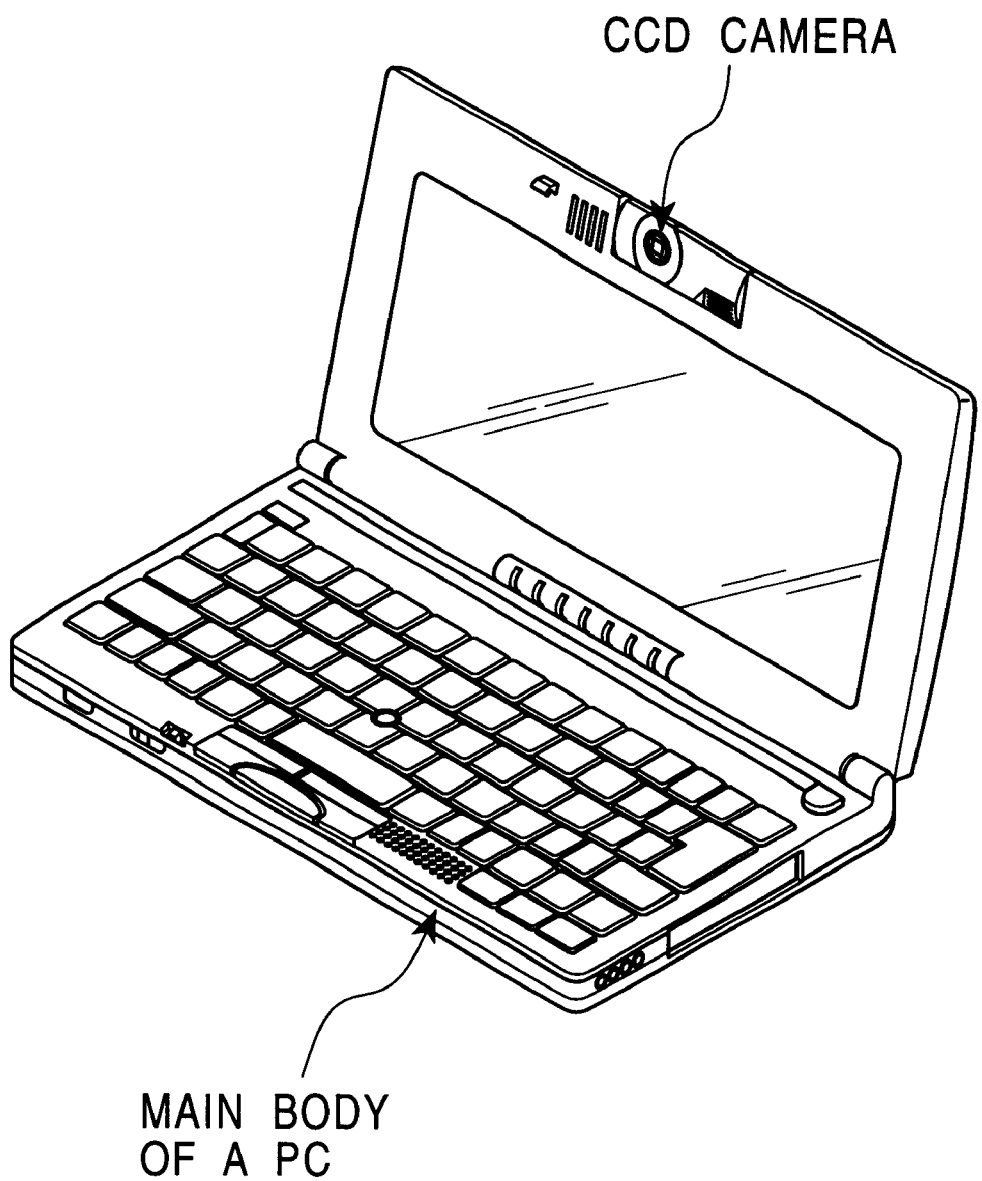
FIG. 2 is a schematic diagram illustrating an example of the outer structure of the communication data producing system.

FIG. 1 is schematic diagram illustrating a communication data producing system 1 according to an embodiment of the present invention. Respective components thereof are described below.

A CPU (Central Processing Unit) 11 serving as a main controller of a system 1 executes various application programs under the control of an operating system (OS). For example, UNIX or Microsoft Windows 98/NT may be employed as the OS. It is desirable that the system 1 include a window system having a bit map drawing capability.

As shown in FIG. 1, the CPU 11 is connected to other devices via a bus 19. Each of the devices on the bus 19 is assigned a unique memory address or I/O address so that the CPU 11 can access each device on the basis of the assigned address. An example of the bus 17 is a PCI (Peripheral Component Interconnect) bus.

A RAM (Random Access Memory) 12 is a volatile memory used to load a program code executed by the CPU 11 and is also used to temporarily store working data during execution. In general, the RAM 12 is made up of a plurality of DRAMs (dynamic RAMs). A ROM (Read Only Memory) 13 is a nonvolatile memory including a particular program code or data permanently stored therein. For example, a self-diagnosable program which is executed when power is turned on and a set of codes (BIOS, Basic Input Output System) for controlling input/outputting operations of hardware.

A display interface 14 is a controller dedicated to actually executing a drawing command issued by the CPU 11 and has a bit map drawing capability according to the SVGA (Super Video Graphic Array) or the XGA (extended Graphic Array) standard. After being processed by the display interface 14, drawing data is temporarily stored, for example, in a frame buffer (not shown) and then displayed on a display 21. The display 21 is, for example, a CRT (Cathode Ray Tube) or a liquid crystal display.

An input device interface 15 serves to interface a user input device such as a keyboard 22 or a mouse 23 to the system 1. The input device interface 15 generates an interrupt to the CPU 11 in response to an input signal given via the keyboard 22 or to a coordinate indication signal given via the mouse 23.

A network interface 16 serves to interface the system 1 to a network such as a LAN (Local Area Network) in accordance with a particular communication protocol such as Ethernet. The network interface 16 is usually provided in the form of a LAN adapter card and is disposed in a PCI bus slot on a mother board (not shown). Instead of using such a network interface, the system 1 may also be connected to an external network via a model (not shown).

A plurality of hosts (not shown) are connected in a transparent fashion to the network so as to form a distributed computer environment. Some hosts on the network serve as routers and the network is connected to other wide area networks such as a LAN or the Internet via the routers. On the network, software programs or data contents are distributed (as is known in the art). For example, a communication data production application according to the present embodiment may be distributed via the network.

An external device interface 17 serves to interface external devices such as a hard disk drive (HDD) 24 and a medium drive 25 to the system 1. The external interface 17 is based upon an interface standard such as the IDE (Integrated Driver Electronics) or SCSI (Small Computer System Interface) standard.

The HDD 24 is a fixed external storage device using a magnetic disk as a storage medium (known in the art). The HDD is superior to other types of external storage devices in terms of high capacity and high data transfer speed. Placing a software program on the HDD 24 such that it can be executed is called "installation" of the program onto the system. In general, program codes including an operating system, application programs, and device drivers executed by the CPU 11 are stored in a nonvolatile fashion on the HDD 24.

The medium drive 25 is used to access data stored on a portable medium such as a CD (Compact Disc), an MO (Magneto-Optical disc), or a DVD (Digital Versatile Disc) mounted on the medium driver 25. The portable medium is used to store a software program or a data file in a computer-readable form chiefly for the purpose of backup or for the purpose of transferring (selling, distributing) such a program or a file between different systems. For example, the communication data production application program according to the present embodiment may be distributed to a large number of users via such portable media.

A camera interface 18 is used to input a picture taken by a camera 28 into the system 1 in real time. The picture input from the camera 28 may be a moving picture or a still picture. A capability of inputting a series of still images is sufficient for the purpose of the present invention.

The camera 28 may be, for example, a CCD (Charge Couple Device) camera. The CCD is an integrated circuit in which MOS (Metal Oxide Semiconductor) electrodes are disposed in the form of a chain so that a charge at the semiconductor surface is sequentially transferred from one electrode to another thereby outputting data of a photographed picture. In the present embodiment, the camera 28 is aimed at a user so as to take a picture of the user.

The communication data producing system 1 may be implemented using dedicated hardware device or may be implemented by executing a particular communication data production application program on a general computer system such as a work station or a personal computer (PC). An example of such a computer system is a PC compatible with, or an upgraded version of, an IBM PC/AT (Personal Computer/Advanced Technology).

A commercially available camera such as a digital camera may be connected, as an optional component, to the computer system 1 via a USB (Universal Serial Bus) port or an i-link (IEEE-1394) port. Alternatively, a notebook PC (such as "Vaio C1" available from Sony Corporation) including a camera disposed integrally on a lid part, on which a display unit is also disposed, may be employed as the communication data producing system 1 according to the present embodiment.

The process of producing communication data using the system 1 is described in detail below.

In the present embodiment, the term "communication data" refers to data transmitted between two or more users wherein the communication data consists of text data representing a content of a conversation and a picture of a user or a talker (the picture may represent only a face or an upper part of a body). It is desirable that the communication data have as small a size as possible so that it can be easily transmitted via a network having a limited bandwidth or can be stored on a medium having a limited storage capacity. It is also desirable that the operation of taking a picture of a user do not impose a significant psychological pressure upon the user.

Figure 3:
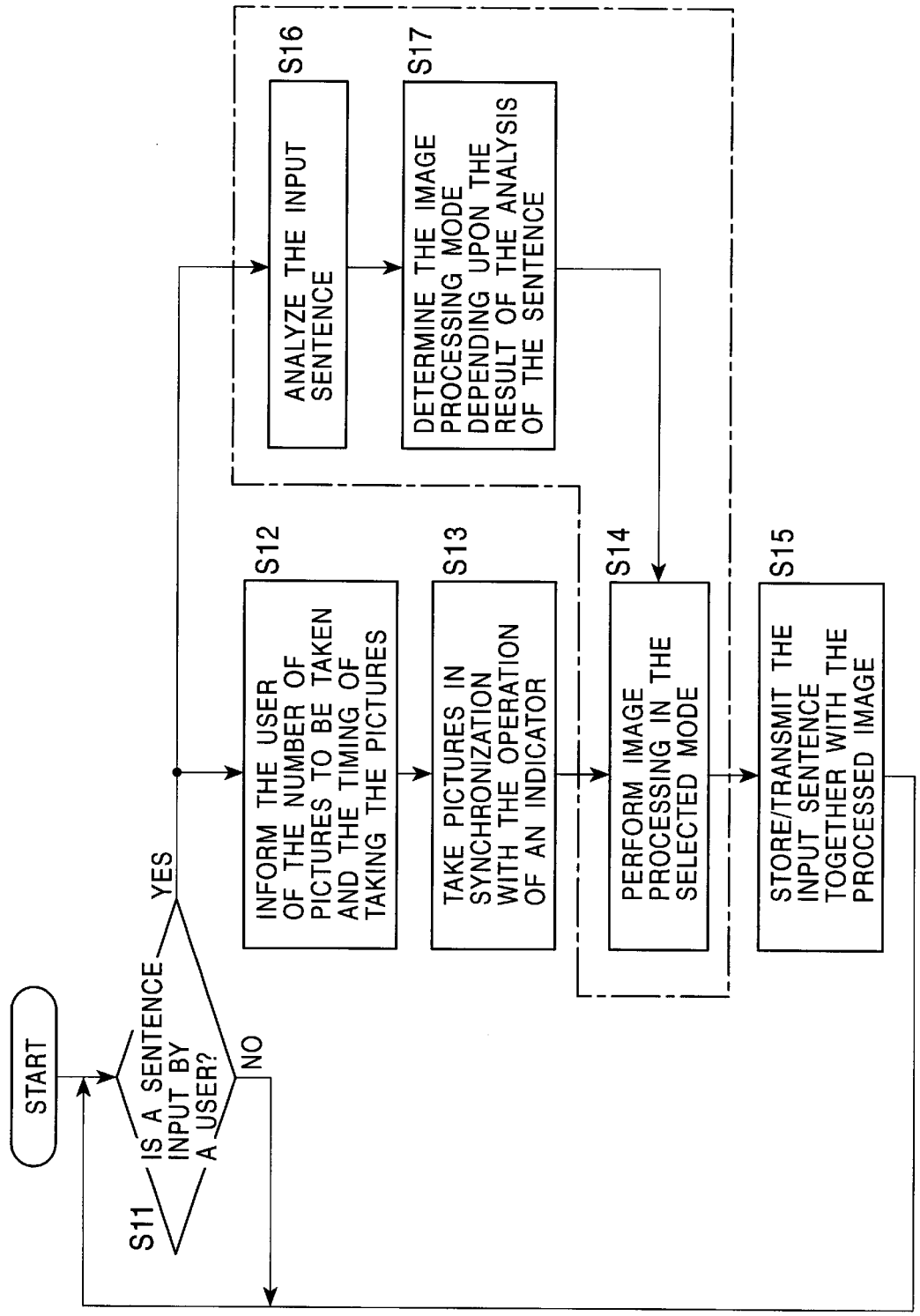
FIG. 3 is a flow chart illustrating a process of producing communication data.

FIG. 3 is a flow chart illustrating the process of producing communication data. The process is described below with reference to this flow chart.

In response to detection of an operation performed by a user to input a sentence into the system 1, the process of producing communication data is started (step S11). Herein, the input sentence refers to text information representing a content of a chat or a message in a collection of messages contained in the communication data.

In step S16, the input sentence is analyzed. In the next step S17, an image processing mode is selected depending upon the result of the sentence analysis. The selected image processing mode is reflected in step S14 in which an image is processed.

The sentence analysis may be to analyze the context of the input sentence and detect a current feeling such as a glad, sad, or angry feeling of a user or detect the purpose (greeting, congratulation, or condolence) of the input sentence.

Alternatively, in addition to words and expressions, marks such as "!" and "?" may be extracted from an input sentence, and the content or the purpose of the sentence may be determined on the basis of the extracted marks. In the case where an input sentence includes a so-called face mark (such as (*^.^*) representing a smiling face, (-_-)zzz representing a sleeping face), the face mark can be an important clue to the sentence analysis.

A user can input a special symbol or an escape sequence to make analysis easy. For example, an expression specifying a manner in which an image processing is performed may be written within parentheses at the beginning or end of a sentence (for example: This is a test. [sepia] (to specify that a picture be displayed in a sepia-color form)). Another example is to place a correspondence mark representing a manner of processing a picture at the beginning or end of a sentence (for example: *This is a negative picture. (* is assigned to color reversion of a picture)).

The image processing includes setting of a background, adjustment of lightness and luminance, superimposing upon another image, and modification of a picture, performed depending upon a feeling of a user or the purpose of a sentence detected as a result of the sentence analysis. More specifically, the image processing includes conversion of a picture into a sepia-color form, reversed-color form (positive-negative conversion), oil-painting-like form, watercolor-painting-like form, or mosaic form, superimposing upon a CG (Computer Graphics) image, modification of color contrast, and/or deformation. For example, if a mark such as "!" is found in an input sentence, a picture may be converted so as to have a darker color. When a face mark with tears is found in an input sentence, a picture may be superimposed on a CG image representing rain or the like to add a sad atmosphere.

In the case where image processing is not necessary, steps S16, S17, and S14 within a box represented by a dashed line in FIG. 3 can be skipped.

When a sentence is input by a user, the operation of photographing the user using the camera 28 is started. First, the user is informed of the number of pictures to be taken and the timing of taking the pictures (step S12).

In the present description, a display area assigned to a user in one transaction is referred to as a frame, and a specified number of pictures are displayed one by one in one frame. For example, when the specified number of pictures is equal to 1, the same still picture is continuously displayed in a frame. In the case where the specified number of pictures is equal to 2 or greater, a specified number of still pictures are displayed one by one in a frame such that the picture displayed in the frame is changed at fixed or random intervals of time (the manner of displaying pictures will be described in further detail later).

Figure 4:
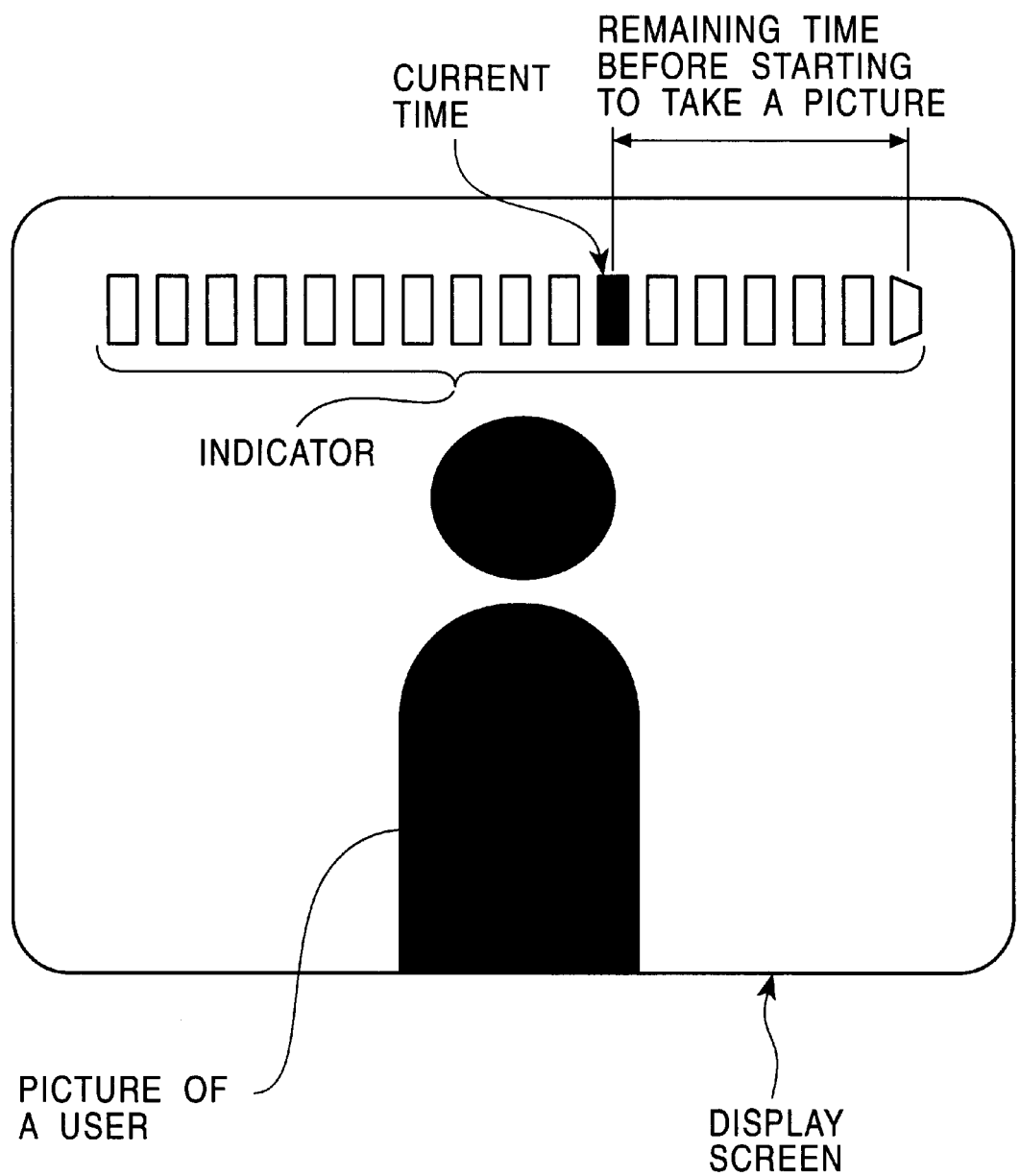
FIG. 4 is a schematic diagram illustrating a manner in which the timing of taking a picture is indicated to a user.

The timing of taking a picture is indicated to a user by displaying a timing indicator on the display 21. Alternatively, the timing of taking a picture may be indicated by outputting a sound from a speaker (not shown). FIG. 4 illustrates an example of a manner in which the timing of taking a picture is indicated on the display 21. In FIG. 4, an indicator as well as a picture monitored through a camera is displayed in a superimposed fashion on the display 21. The indicator includes a plurality of small blocks arranged in a line. Small blocks are sequentially turned on in a direction along the line so as to count down the timing. In response to the indication, the user can form a desired expression on his/her face. This makes it easy for the user to add a visual effect to a picture. Use of a plurality of still pictures allows enhancement in expression (for example, a gesture may be represented by a plurality of still images which are somewhat different).

Furthermore, because a picture of a user is not always taken, a less psychological pressure is imposed upon the user, and thus the user can behave in a relaxed fashion. When a user is in his/her home, the user may not want to be photographed. In this case, a physical object such as a doll may be photographed instead of the user himself/herself.

Each time a photographing timing is reached, a picture of a user present in front of the system 1 is taken by the camera 28 (step S13). The photographed picture is then subjected to image processing in a selected mode so as to add a visual effect such as ornamentation depending upon an input sentence (step S14). However, as descried earlier, the image processing in step S14 may be skipped.

A visual effect may be added by performing, for example, conversion of a picture into a sepia-color form, reversed-color form (positive-negative conversion), oil-painting-like form, watercolor-painting-like form, or mosaic form, superimposing upon a CG (Computer Graphics) image, modification of color contrast, and/or deformation. For example, if a mark such as "!" is found in an input sentence, a picture may be converted so as to have a darker color.

The processed images are combined with the input sentence to form one "communication data". The resultant communication data is stored on a specified medium or transmitted to a particular server (not shown in FIG. 1).

When communication data obtained via the processing routine descried above is used in a collection of messages with pictures (which will be described later), the obtained communication data is stored on a medium. In the case where communication data including a sentence and pictures is used in one transaction in a chat, the communication data is transmitted to a chat server (as will be described in detail later).

Because the communication data includes visual information provided by a picture of a user, the communication data can more stimulate a user who receives the communication data than text-base communication data can. Furthermore, it is possible to represent a motion using a plurality of still pictures thereby transmitting a large amount of information. Because the motion is represented using only a plurality of still pictures, the data size is much smaller than is required to represent a motion using a moving picture. This allows a reduction in a transmission load or a storage load.

The communication data according to the present embodiment may be described using a programming language such as Java. For example, communication data including one sentence and two still pictures attached therewith may be described as follows.

```
//format 0
//basic style (one sentence and two still pictures)
class Unitdata{
String text;
Image frame1;
Image frame2;
}
``` where "String texts1" is text data of an input sentence, and "Image frame1" and "Image frame2" are still picture data.

In the case a plural number (not specified) of pictures are attached to one sentence in a transaction, communication data may be described as follows.

```
//format 1
//general type (one sentence and a plural number (not
specified) of still images
class Unitdata{
String text;
Image[] frame;
}
```

In the above description, still pictures are represented in an array type.

Alternatively, photographed pictures may be provided in a list structure as shown below.

```
//format 2
//description in a list structure
class Unitdata{
String text;
ImageList frame;
}
class ImageList{
Image frame;
ImageList next;
}
```

One communication data may include a plurality of sentences as well as a plurality of photographed pictures. In this case, communication data may be described using a format modified from the above-described format 1, as follows.

```
//format 3
//modified type (a plurality of input sentences and a
plural number (not specified) of still pictures
class Unitdata{
String[] text;
Image[] frame;
}
```

The format 2 described above may be modified so as to provide sentences in the form of a list as well as photographed pictures as shown below.

```
//format 4
//description in a list structure
class Unitdata{
StringList text;
ImageList frame;
}
class ImageList{
Image frame;
ImageList next;
}
class StringList{
String text;
StringList next;
}
```

In the present embodiment, communication data is formed of a set of an input sentence and a picture of a user taken when the sentence is input. In a communication data reproducing apparatus, an input sentence is always displayed on a browser screen and a picture is switched from time to time so as to provide an expressive picture having a motion to a user.

Figure 10A:
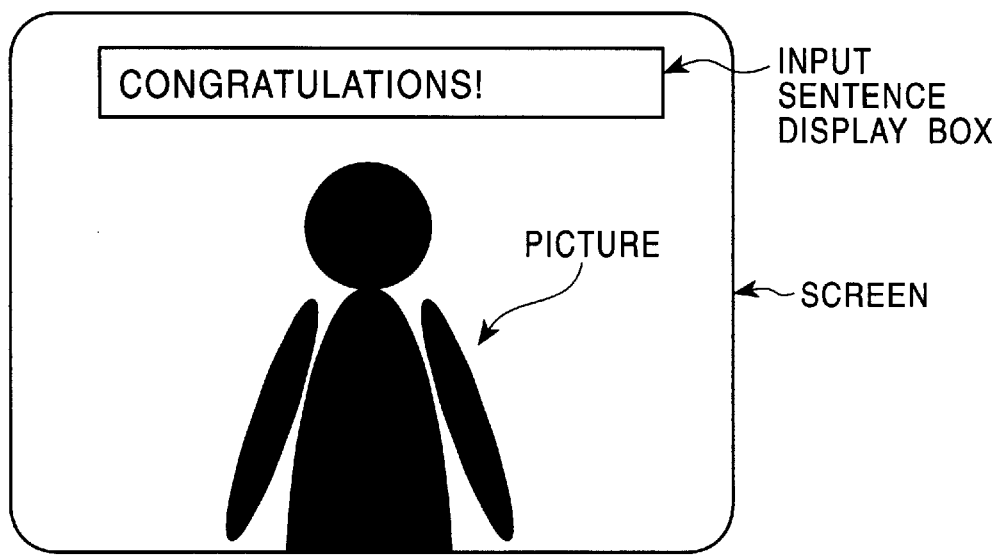
FIG. 10 is a schematic diagram illustrating a manner in which reproduced communication data is displayed.
Figure 10B:
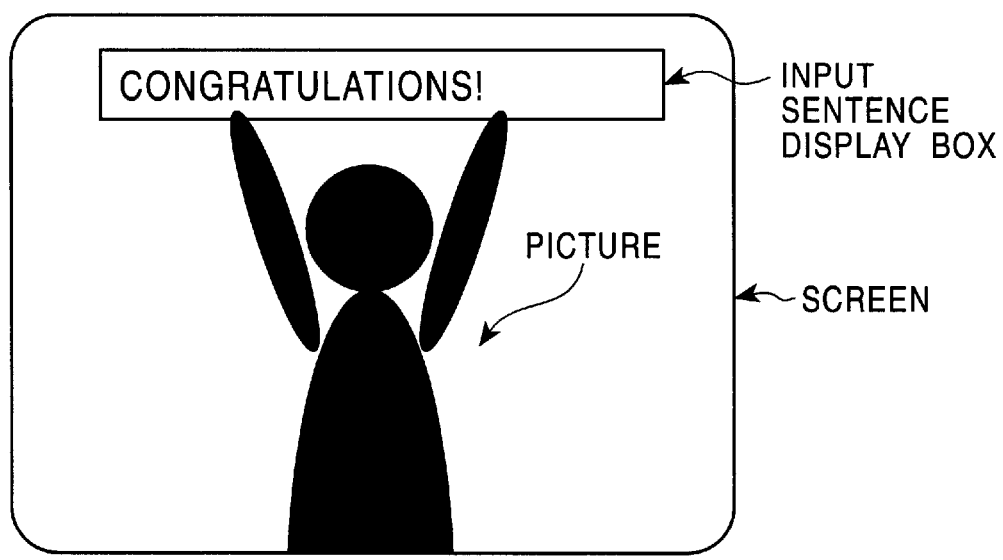

In a communication data producing apparatus, for example, if a user makes a performance or a motion such as a gesture when a picture is taken, a greater amount of information is embedded in communication data. FIG. 10 schematically illustrates a manner in which communication data including pictures representing a gesture is displayed. As shown in FIG. 10, it is possible to represent a gesture of moving hands up and down by alternately displaying two pictures on the browser in the communication data producing apparatus.

Instead of switching the picture at fixed intervals of time, the picture may be switched at random intervals determined using random numbers or the like so that an unpredictable motion is provided using only still pictures thereby making the picture look like a moving picture.

A set of still pictures is taken in a short time, and thus a user can see all pictures in a very short time, unlike a moving picture which needs a long time to see. Because a set of still pictures represents a rather small motion in a short time, it is easy to understand the content of the set of pictures displayed in a frame. That is, unlike a moving picture that is difficult to understand at a glance, the content of a set of still pictures can be easily understood at a glance.

A set of still pictures can represent a wide variety of motions. For example, a gesture of pointing at something with his/her finger can be embedded in a set of still pictures. When a user does not make an intentional motion, a natural slight motion is represented by a set of still pictures. When a set of pictures including such a natural slight motion is displayed one by one, it looks like a moving picture to a user who sees it.

In the case where communication data includes a plurality of sentences as well as a plurality of pictures, the sentence displayed on the browser may be switched at fixed or random intervals of time.

In the process of producing communication data described above with reference to FIG. 3, not only the inputting of a sentence and pictures but also the image processing upon the pictures are performed by the same single system 1. However, image processing generally needs a high-power computer resource. Therefore, when the system 1 is realized by a computer designed for use by general consumers, such as a personal computer, it may be difficult for the system 1 to execute image processing. In such a case, steps for the image processing in the flow chart shown in FIG. 3 may be performed by an external computer system having higher performance.

Figure 5:
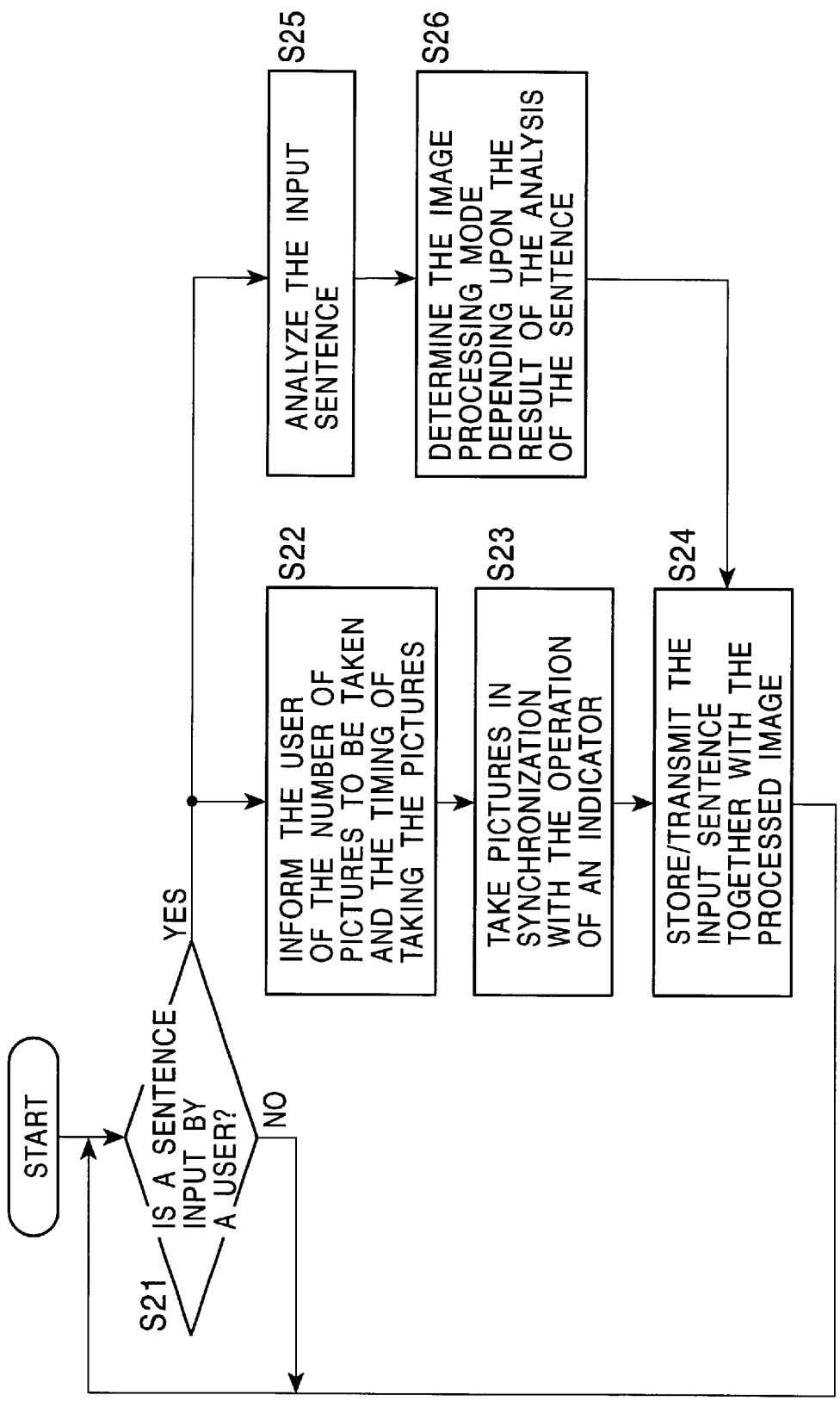
FIG. 5 is a flow chart illustrating a modification of the process of producing communication data.

FIG. 5 is a flow chart illustrating a modification of the process of producing communication data shown in FIG. 3.

The main difference between them is in that the image processing is performed by an image processing server disposed outside the system 1. Although not shown in FIG. 1, the image processing server is connected to the network via the network interface 16.

In response to detection of an operation performed by a user to input a sentence into the system 1, the process of producing communication data is started (step S21). Herein, the input sentence refers to text information representing a content of a chat or a comment in a collection of messages contained in the communication data.

In step S25, the input sentence is analyzed. In the next step S26, an image processing mode is selected depending upon the result of the sentence analysis. The sentence analysis may be to analyze the context of the input sentence and detect a current feeling such as a glad, sad, or angry feeling of a user or detect the purpose (greeting, congratulation, or condolence) of the input sentence. The image processing includes setting of a background, adjustment of lightness and luminance, superimposing upon another image, and modification of a picture, performed depending upon a feeling of a user or the purpose of a sentence.

When a sentence is input by a user, the operation of photographing the user using the camera 28 is started. First, the user is informed of the number of pictures to be taken and the timing of taking the pictures (step S22). Each time a photographing timing is reached, a picture of a user present in front of the system 1 is taken by the camera 28 (step S23).

The processed images are combined with the input sentence to form one "communication data". In the example shown in FIG. 4, data specifying an image processing mode selected in step S26 is attached to communication data and transmitted to a particular image processing server (step S24).

The image processing server performs the specified image processing upon the respective photographed pictures contained in the communication data. After completion of the image processing, the communication data is stored on a specified medium or transmitted to the requester or a particular server (not shown in FIG. 1).

Figure 6:
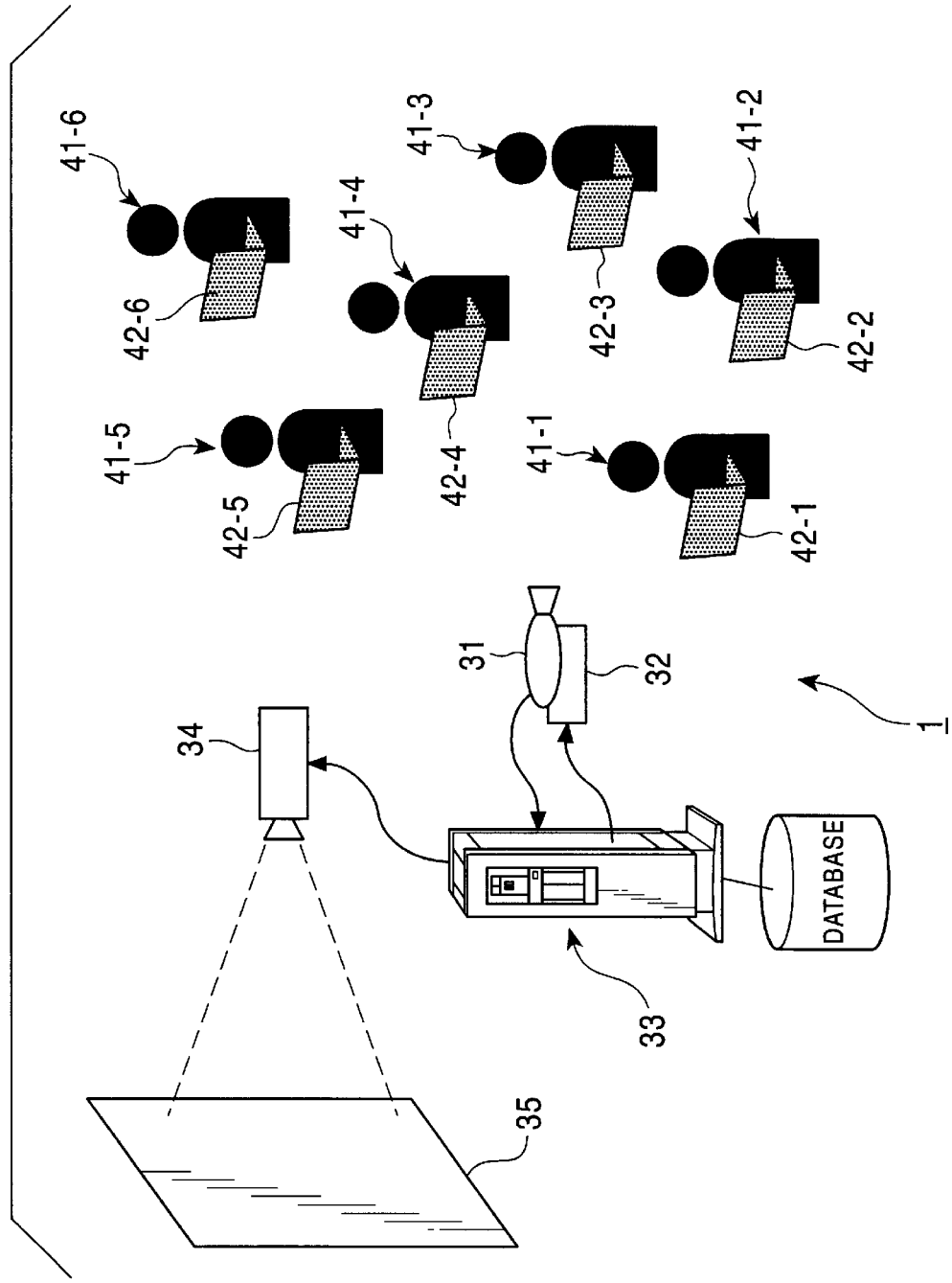
FIG. 6 is a schematic diagram illustrating an example of a configuration of a communication data producing system according to an embodiment of the present invention.

FIG. 6 schematically illustrates an example of a configuration of a communication data producing system 1-2 according to an embodiment of the present invention.

In the embodiment shown in FIG. 6, unlike the embodiment shown in FIG. 1, a single camera and the single communication data producing system 1-2 are shared by a plurality of users. More specifically, the communication data producing system 1-2 may be advantageously used in an academic meeting, a lecture, a conference or the like in which a large number of participants communicate with one another.

In the system 1-2, a camera 31 is mounted on a driving table 32 movable in X, Y, and Z directions and/or rotatable around X, Y, and Z axes. The image processing upon pictures taken by the camera 31 and the control of the driving table 32 are performed by a server 33. Communication data transmitted from respective users 41-1, 41-2 and so on are all processed by the server 33. Each communication data includes a sentence input by a user and one or more picture of the user (as in the previous embodiment described above).

In general, each user 41-1, 41-2, . . . , at various locations in a room are uniquely assigned a user ID and location information representing for example seat number, and such user information is managed using a database. When a user sends a photographing request together with data indicating his/her user ID to the server 33, the server 33 retrieves the location information associated with the user from the database and aims the camera 31 at the user by driving the driving table 32.

Visual information such as cyber codes (not shown) uniquely corresponding to the respective user IDs may be assigned to the respective users. In this case, the server 33 can identify the users on the basis of visual information attached to the respective users 41-1, 41-2, . . . , by scanning the inside of the room, and thus it is not necessary to register the location information associated with the users in advance.

On the other hand, each user 41-1, 41-2, . . . , is given a portable computer 42-1, 42-2, . . . , such as a notebook PC for inputting sentence or a statement. The portable computers 42-1, 42-2, . . . , are connected to the server 33, and also to the other portable computers, via a LAN such as Ethernet or a short-distance wireless network such as Bluetooth so that sentences input by users can be transmitted to the server 33.

Instead of inputting a sentence by pressing keys on a portable computer 42, one or more microphone (not shown) may be disposed in the room. In this case, a voice input via the microphone is input to the server 33 via a cable. The server 33 performs voice recognition to convert the input voice into text data or directly incorporates the received voice data into communication data without performing voice recognition.

The server 33 has an image outputting device for outputting processed results of communication data transmitted from users 41-1, 41-2, . . . , from time to time. Preferably, the image outputting device is a large-sized display which is disposed in the room so that all users 41-1, 41-2, . . . , can share the processed results. The large-sized display may be realized, for example, by projecting an image formed by an LCD projector 34 driven by the server 33 onto a screen 35. Instead of using the large-sized display, the processed results given by the server 33 may be returned to the portable computers 42-1, 42-2, . . . , of the respective users 41-1, 41-2, . . . , via a communication medium such as a LAN or Bluetooth.

In communication, in response to a user action such as raising a hand or on a round robin basis, permission to make a statement is given to a user 41. (Alternatively, any strict rule about permission to make a statement is set in communication, and any user may be allowed to freely make a statement. In this case, when a user inputs a statement, permission to make a statement is automatically given to that user.)

When a user 41 is obtained permission to make a statement, the user 41 inputs a sentence or a statement into his/her portable computer 42.

The server 33 identifies the location of the user 41 who has obtained permission to make a statement on the basis of his/her user ID. Alternatively, the server 33 scans the inside of the room to look for the user 41 on the basis of visual information such as a cyber code attached to each user 41.

The server 33 then drives the driving table 32 such that the user 41 of interest is aimed at by the camera 31, that is, such that an image of the user 41 is captured into an image area of the camera 31. A picture of the user 41 is taken one or more times with particular timings. A photographing timing indicator (refer to FIG. 4) may be displayed on the large-sized screen 35 or on the portable computers 42-1, 42-2, . . . , of the respective users. Alternatively, a pilot lamp or the like (not shown) may be disposed in the room and a photographing timing may be visually indicated by the pilot lamp.

An example of the server 33 or each portable computer 41 shown in FIG. 6 is a PC compatible with, or an upgraded version of, an IBM PC/AT.

Figure 7:
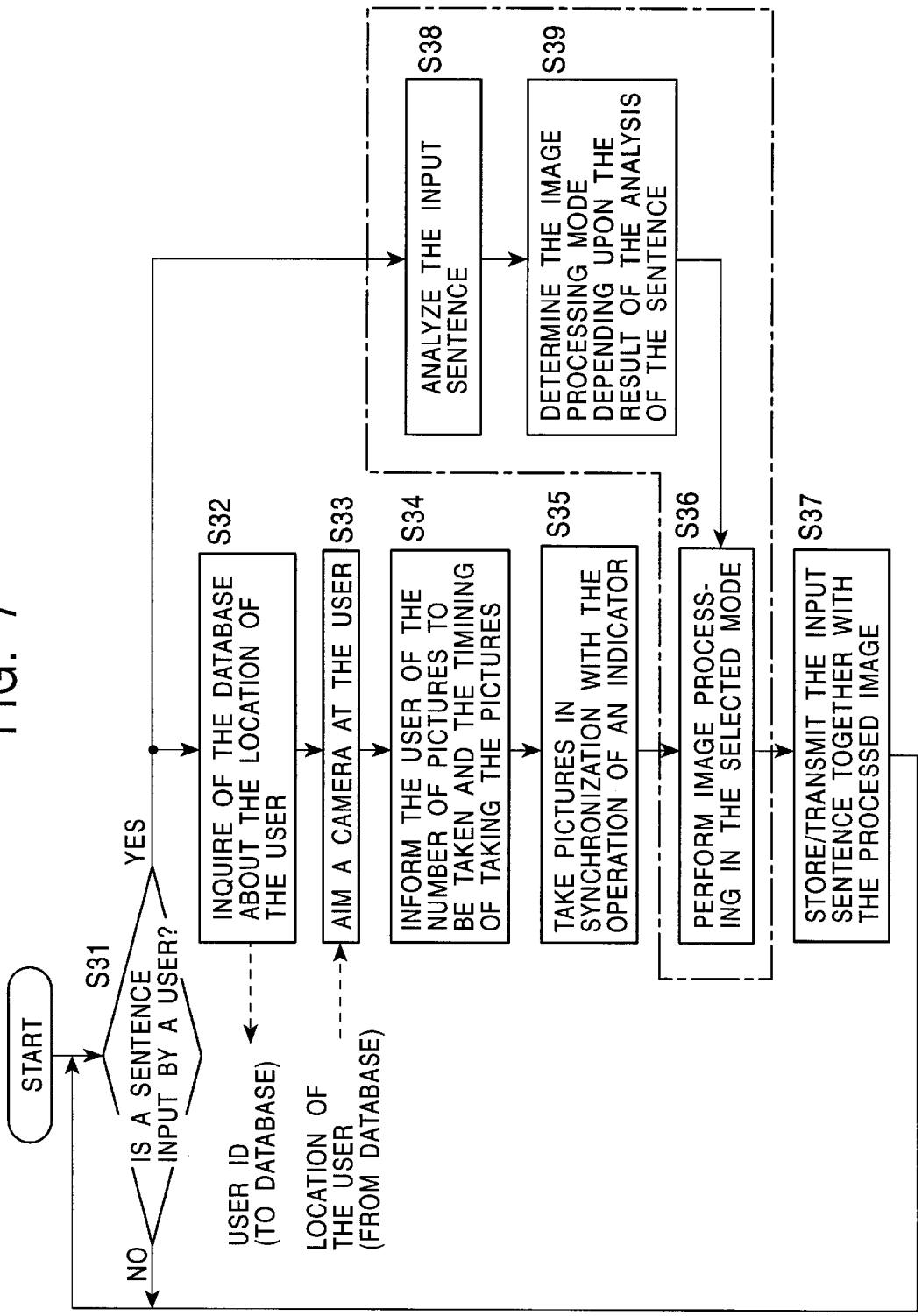
FIG. 7 is a flow chart illustrating a process performed by the communication data producing system shown in FIG. 6 to produce communication data.

FIG. 7 is a flow chart illustrating the process performed by the communication data producing system 1-2 shown in FIG. 6 to produce communication data. Referring to FIG. 7, the process is described below.

In response to detection of an operation performed by a user to input a sentence into the system 1, the process of producing communication data is started (step S31). Herein, the sentence is input by the user to represent his/her statement in a meeting or another community.

If the server 33 detects that a particular user has obtained permission to make a statement, the server 33 issues a query together his/her user ID to the database to acquire the location information indicating the location of that user in the room (step S32). In response, the database returns the location information associated with that user.

In accordance with the obtained location information, the server 33 drives the driving table 32 such that the camera 31 aims at the user (step S33).

In step S38, the input sentence is analyzed. In the next step S39, an image processing mode is selected depending upon the result of the sentence analysis. The selected image processing mode is reflected in step S36 in which an image is processed.

The sentence analysis may be to analyze the context of the input sentence and detect a current feeling such as a glad, sad, or angry feeling of a user or detect the purpose (affirmation or denial to a discussion, representations of similar or opposite meanings) of the input sentence. The image processing includes setting of a background, adjustment of lightness and luminance, superimposing upon another image, and modification of a picture, performed depending upon a feeling of a user or the purpose of a sentence. In the case where image processing is not necessary, steps S38, S39, and S36 within a box represented by a dashed line in FIG. 7 can be skipped.

After the camera 31 has aimed at the user, the operation of taking a picture of the user is started. First, the user is informed of the number of pictures to be taken and the timing of taking the pictures (step S34).

The timing of taking a picture by the camera 31 may be visually indicated in the above-described manner. In response to the indication of the photographing timing, the user can form a desired expression on his/her face. This makes it easy for the user to add a visual effect to a picture. If a plurality of still pictures are used, it becomes possible to enhance expression (for example, a gesture may be represented by a plurality of still images which are somewhat different). Furthermore, because a picture of a user is not always taken, a less psychological pressure is imposed upon the user.

In the present embodiment, a display area assigned to a user in one transaction is referred to as a frame, and a specified number of pictures are displayed one by one in one frame. For example, when the specified number of pictures is equal to 1, the same still picture is continuously displayed in a frame. In the case where the specified number of pictures is equal to 2 or greater, a specified number of still pictures are displayed one by one in a frame such that the picture displayed in the frame is changed at fixed or random intervals of time (the manner of displaying pictures will be described in further detail later).

Each time a photographing timing is reached, a picture of a user present in front of the system 1 is taken by the camera 28 (step S35). The photographed picture is then subjected to image processing in a selected mode so as to add a visual effect such as ornamentation depending upon an input sentence (step S36). However, as descried earlier, the image processing in step S36 may be skipped.

The processed images are combined with the input sentence to form one "communication data". The communication data is transmitted to the server 33 and is processed by the server 33 in a unified fashion. The communication data may be described in one of format: format 0 to format 5.

Because the communication data includes visual information provided by a picture of a user, the communication data can more stimulate a user who receives the communication data than text-base communication data can. Furthermore, it is possible to represent a motion using a plurality of still pictures thereby transmitting a large amount of information. Because the motion is represented using only a plurality of still pictures, the data size is much smaller than is required to represent a motion using a moving picture. This allows a reduction in a transmission load or a storage load.

Figure 8:
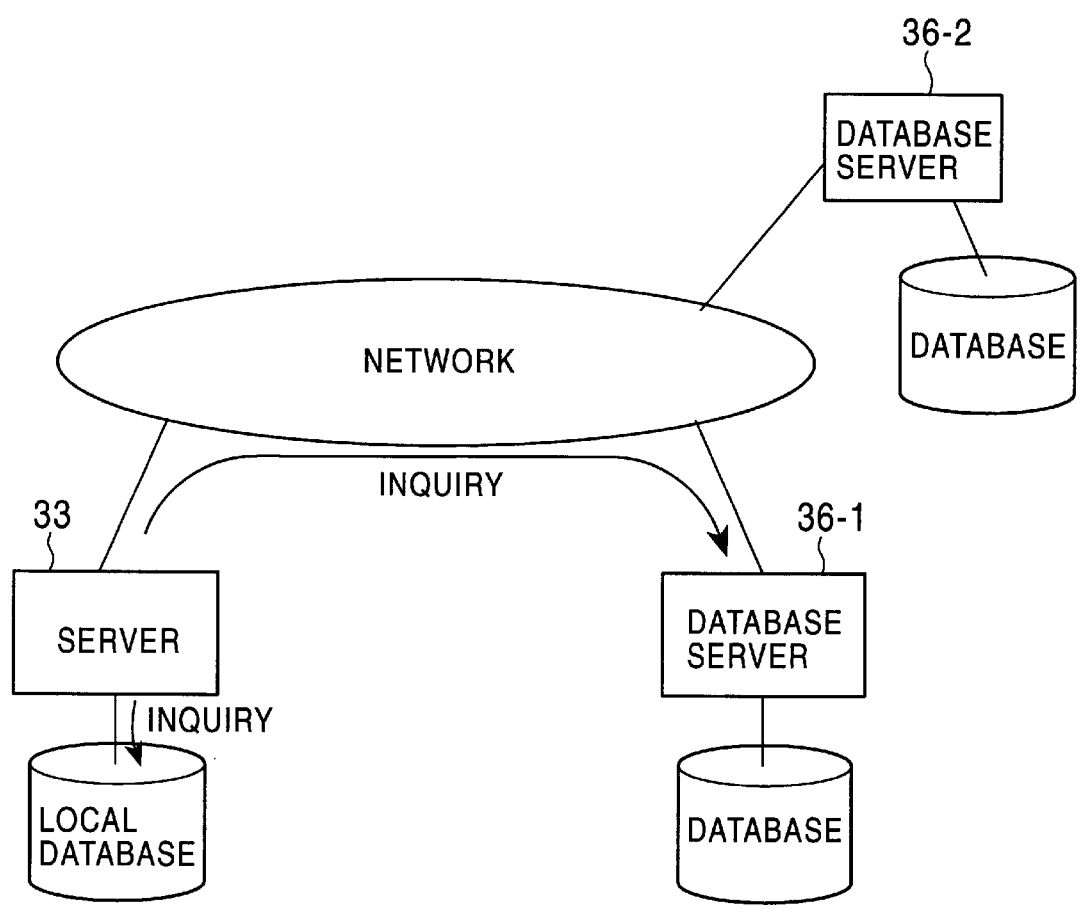
FIG. 8 is a schematic diagram illustrating a configuration of a system in which user information is managed by a plurality of database servers connected via a network.

In the example described above with reference to FIGS. 6 and 7, the database used to manage the user IDs and the user location information is locally stored in the server 33. However, the database is not necessarily required to be stored in the server 33. For example, a database server 36 may be disposed on the network, and the server 33 may issue a query to the database server 36 each time a user makes a statement. In the case where the community such as a meeting includes a large number of users or in the case where the community is distributed as is the case with a remote conference, the management of the user information may be performed by a plurality of database servers 36-1, 36-2, . . . , (refer to FIG. 8).

Figure 9:
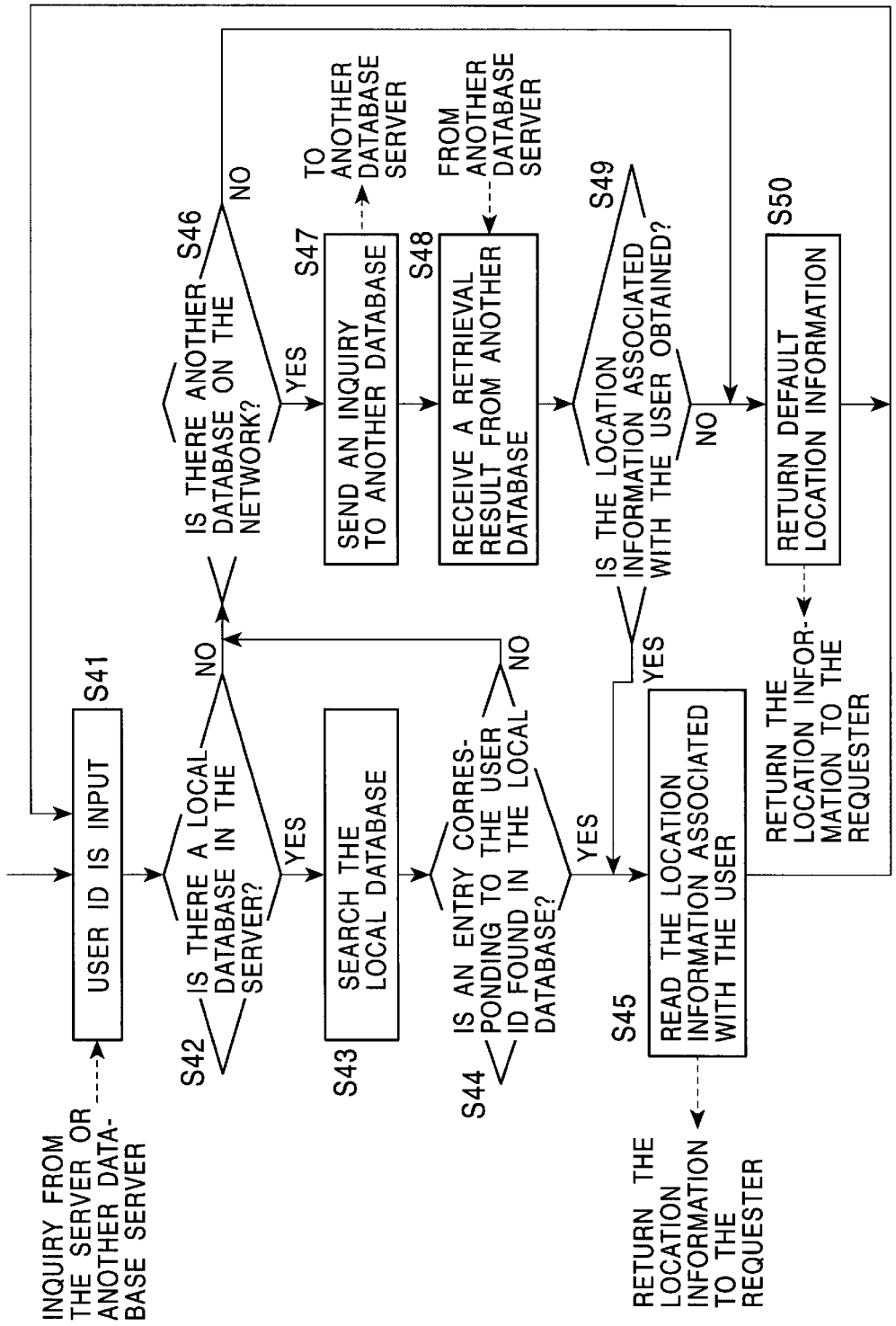
FIG. 9 is a flow chart illustrating a process performed by a database server in response to a query issued by a user.

In this case, in response to a query to the database in step S32 in FIG. 32, the database server 36 may execute a routine shown in the flow chart of FIG. 9. Each step of this flow chart is described below.

Upon receiving a query together with a user ID from the server 33 or another database server via a network, the database server 36 starts the routine (step S41).

In response to the query, the server 36 determines whether the server 36 has a local database (step S42). If there is a local database, the server 36 searches this local database (step S43) to determine whether the local database includes an entry corresponding to the user ID (step S44). If the entry is found, the server 36 reads the location information associated with the user from the entry (step S45) and returns it to the server 33 which issued the query or to another database server.

In the case where when the database server 36 receives the query, a local database has not been built therein (step S42), or in the case where an entry corresponding to the query is not found in the local database (step S44), the process goes to step S46 to determine whether there is another database server on the network.

If there is no other database server on the network, the process goes to step S50. In step S50, default location information is returned to the server 33 which issued the query or to another database server.

In the case where another database server is found on the network, the database server 36 sends a query together with the user ID to the database server found (step S47) and receives a returned value (step S48).

In the case where location information associated with the user was obtained via the query to another database server (step S49), the process goes to step S45 to return the obtained location information to the server 33 which issued the request or another database server.

In the case where location information associated with the user was not obtained via the query issued to another database server (step S49), the process goes to step S50 to return default location information to the server 33 which issued the request or another database server.

If the server 33 receives the location information from the database, the server 33 aims the camera 31 at the user and takes pictures of the user with predetermined timings (as described above). Furthermore, the server 33 produces communication data including an input sentence and a plurality of photographed pictures.

2. Application to a Chat System

As described earlier, communication data produced according to the present embodiment may be used as a message in a chat system. This makes it possible to provide a "chat with pictures" in which each message attached with an actually-photographed picture is sent. In the chat with pictures, logging-in users can see expressions of their faces and thus enhanced feelings of presence can be obtained. An example of a char system according to the present invention is described below.

Figure 11:
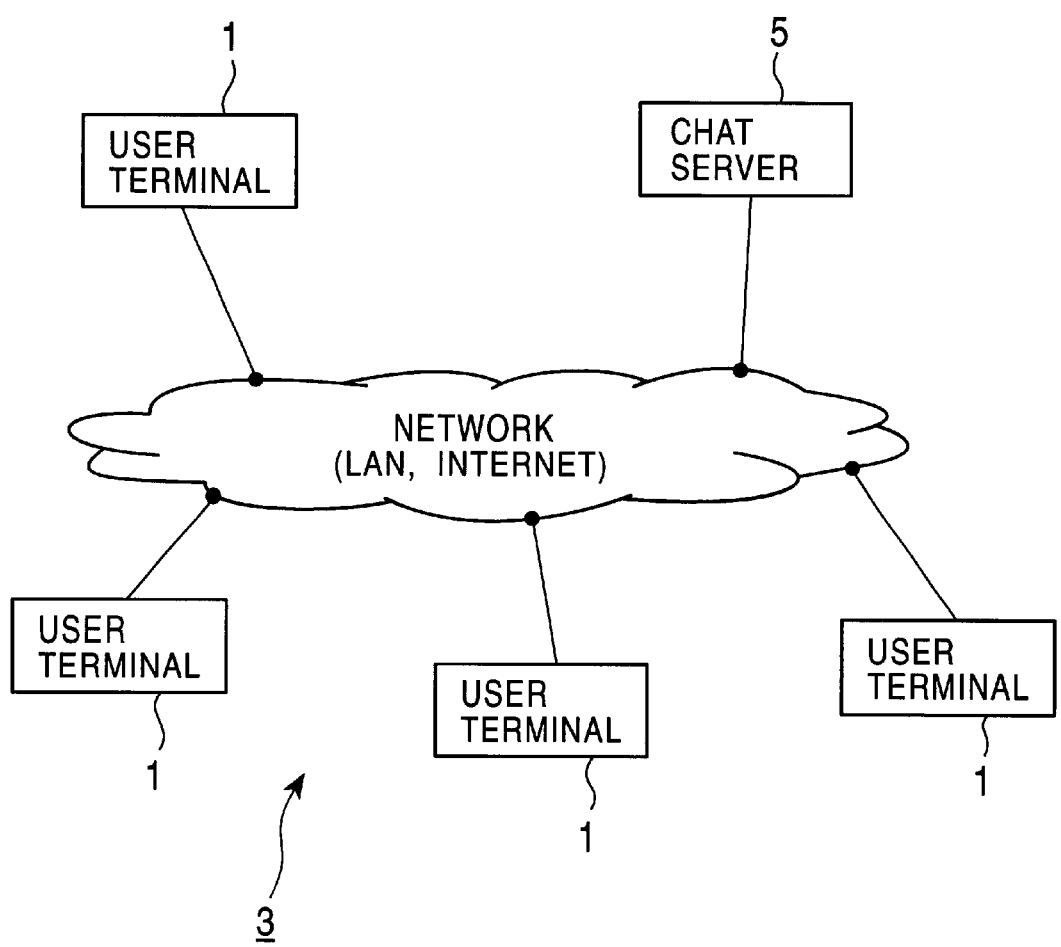
FIG. 11 is a schematic diagram illustrating a configuration of a chat system according to an embodiment of the present invention.

FIG. 11 schematically illustrates a configuration of a chat system 3 according to the present embodiment. As shown in FIG. 3, the chat system 3 includes a plurality of user terminals used to log in a chat and a chat server for generally managing messages uploaded from the respective user terminals.

The chat server and the respective user terminals are connected to one another via a distributed network such as a LAN or the Internet. In this system, a transaction such as requesting of service and providing of service is performed according to a protocol such as TCP/IP (Transmission Control Protocol/Internet Protocol). In a distributed network environment, the respective users are not necessary to concern themselves for resource objects such as a program or data. Procedures and methods executed by computers are also distributed and managed over the network. For example, a certain process executed by a computer on the network may call and execute a procedure in a process running on another computer.

In the present embodiment, a message transmitted by a logging-in user is communication data including an input sentence and a plurality of pictures (as described above). The communication data producing system shown in FIG. 1 may be employed as the user terminal.

The chat system 3 is constructed in the form of a server-client system in which, for example, the IRC (Internet Relay Chat) protocol may be used. The IRC protocol used in an IRC is defined in the RFC (Request For Comments) 1459 standard.

The chat server 5 collects sentences or communication data transmitted from the respective logging-in user terminals 1 and manages them in accordance with the order of time. The processing results are distributed from the chat server 5 to all logging-in servers.

Figure 12:
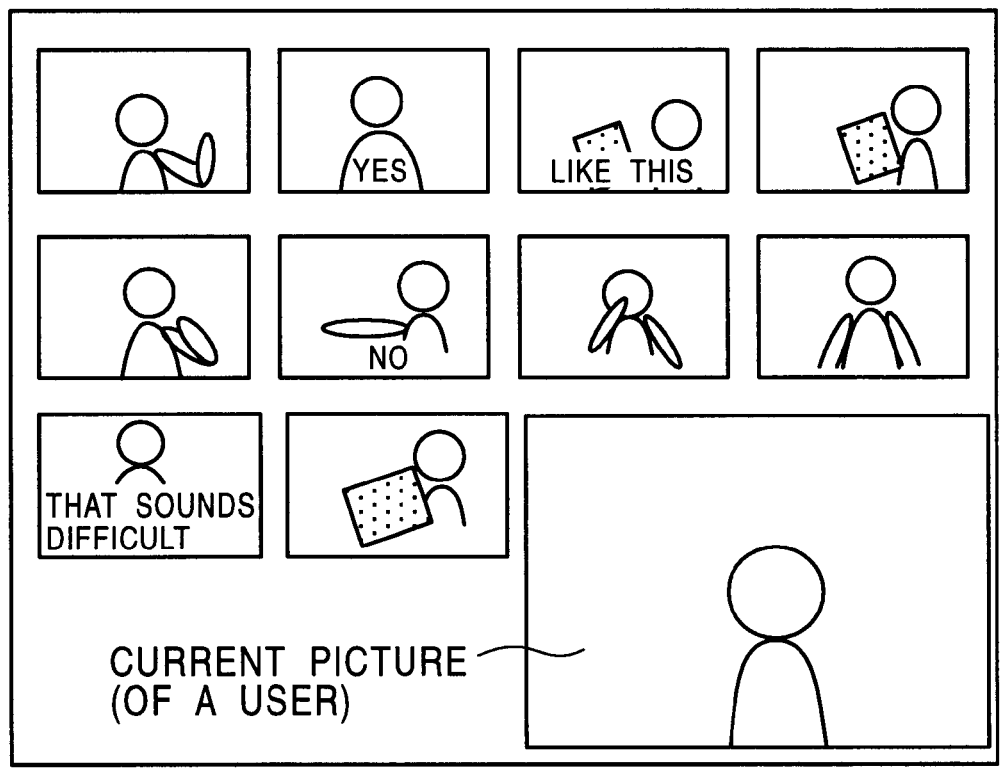
FIG. 12 is a schematic diagram illustrating a chat browser screen on a user terminal.

FIG. 12 illustrates an example of a chat browser screen of the user terminal 1. As shown in FIG. 12, window frames for displaying messages of respective users are arranged on the browser screen in the order of time. In each frame, a sentence input by a user and a still picture of the user are displayed.

On the screen, the plurality of frames are arranged at locations determined using random numbers. When a string of characters is written in a horizontal direction, characters are usually written from left to right. However, in the case of pictures arranged in the form of an array, human eyes cannot determine in which directions the pictures are arranged in the order of time. In the present embodiment, in order to avoid the above problem, as shown in FIG. 12, the horizontal width of the frames is varied from frame to another so as to make it possible for users to visually understand that the frames are arranged in a horizontal direction in the order of time.

The pictures displayed in the respective frames are switched from time to time at fixed or random intervals of time. In the case where all pictures are switched at the same time or at fixed intervals, the plurality of frames on the same screen change in synchronization with each other, and thus users will have an unnatural feeling. In the present embodiment, the switching timings may be determined using random numbers to reduce the artifact.

The switching of pictures displayed in the respective frames may be controlled by the chat server 5 in a unified fashion. Alternatively, after communication data has been transmitted to the user terminals 1, the switching of pictures may be controlled by the respective user terminals 1 (this allows a reduction in the load imposed upon the server and a reduction in communication capacity). A picture of a user currently being monitored may be displayed in a frame at the bottom right of the browser screen of each user terminal 1 (as shown in FIG. 12) and the displaying of a current statement and the inputting of a next statement may be performed via the same window frame.

In the system for the chat with pictures according to the present embodiment, because pictures are displayed in addition to statements, a less number of statements can be displayed in one frame on the browser screen than can be in the conventional chat system. However, because a face expression of a user or a specific object can be displayed on the screen, a much larger amount of information can be represented on the screen than can be represented by using only a string of characters (for example, if a message "I bought a new portable terminal." is displayed together with a picture of that new portable terminal, much information is provided). Besides, in the present embodiment in which actually photographed pictures are used, unlike the conventional chat system using cartoon characters, the chat system does not have the problem that displayed pictures do not match the atmosphere.

Figure 13:
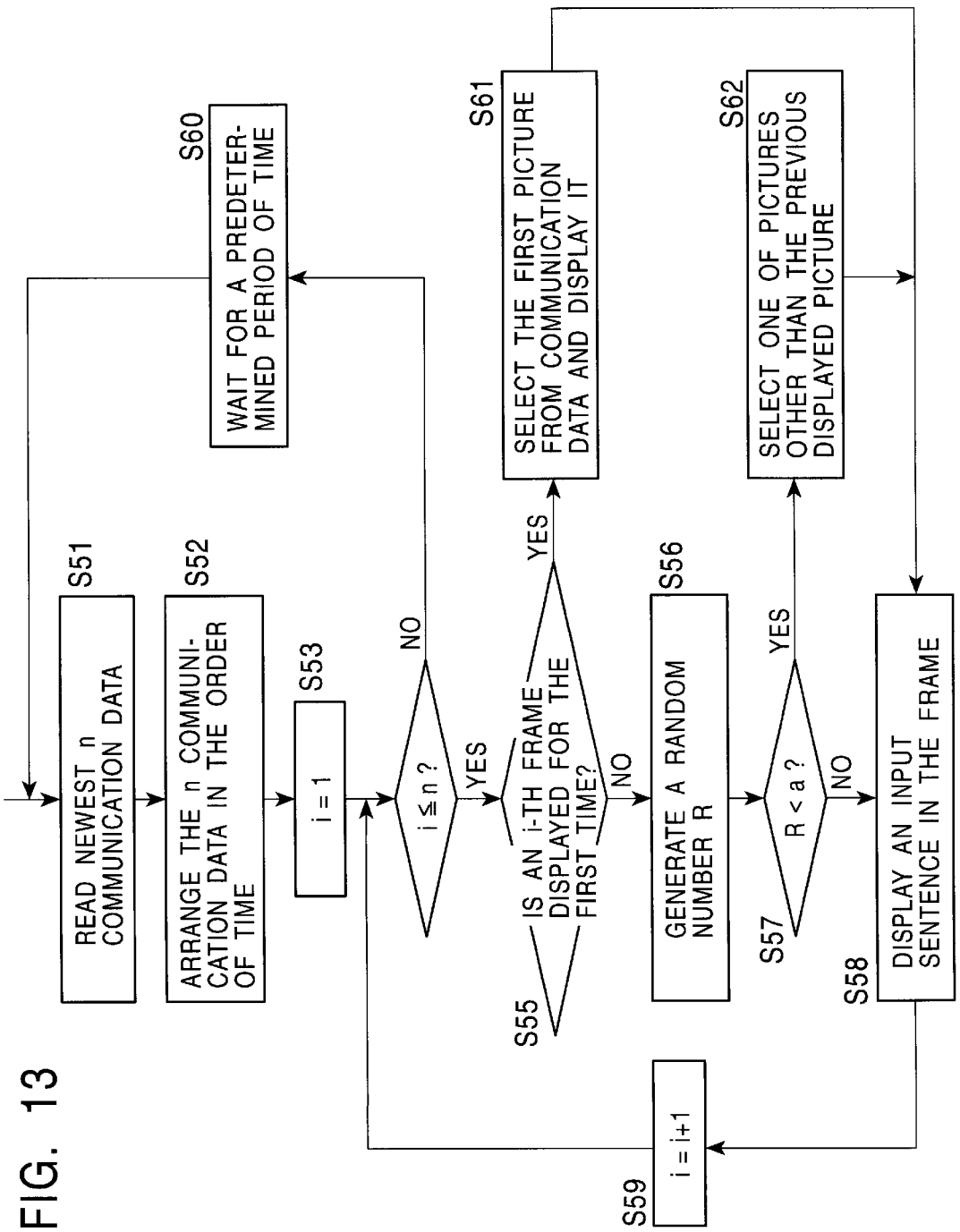
FIG. 13 is a flow chart illustrating a process of displaying communication data on a user terminal.

FIG. 13 illustrates, in the form of a flow chart, a process of displaying communication data in frames on each user terminal 1 in the chat system 5. Referring to this flow chart, the process is described below.

The user terminal 1 stores communication data transmitted one by one from the chat server 5, in the order of time. The user terminal 1 reads newest n communication data (step S51) and displays them in the respective frames, in the order of time, on the chat browser screen (step S52).

Herein, n is the number of frames which can be displayed on the single browser screen. In step S53, i is set to 1. The process returns to step S51 at predetermined intervals of time until i has reached the maximum allowable number n (step S60), and the process of displaying communication data in the frames is executed repeatedly in a similar manner.

In steps S55 to S58, a picture displayed in an ith frame is switched. That is, in step S55, it is determined whether the ith frame is displayed for the first time. If yes, an arbitrary picture contained in the communication data is selected and displayed in the frame (step S61).

In the case where it is determined in step S55 that the ith frame is displayed not for the first-time, a random number R ($0.0 \leq R \leq 1.0$) is generated (step S56), and R is compared with a constant a (($0.0 \leq a \leq 1.0$) (step S57). If R<a, an input sentence is displayed in the frame without switching the picture displayed in the frame (step S58). If R≧a, a picture other than the previously displayed picture is selected from the pictures contained in the communication data and displayed in the frame (step S62), and an input sentence is displayed in the frame (step S58).

If the pictures displayed in the respective frames are switched at fixed or regular intervals of time, a plurality of frames displayed on the chat browser are changed at the same time or in synchronization with each other, and thus an unnatural feeling is given to users. In the present embodiment, because the timings of switching the pictures are determined using random numbers, the artifact can be eliminated.

In step S59, the variable i is incremented by 1. Thereafter, the process returns to step S54 to switch the picture in the next frame.

Figure 14:
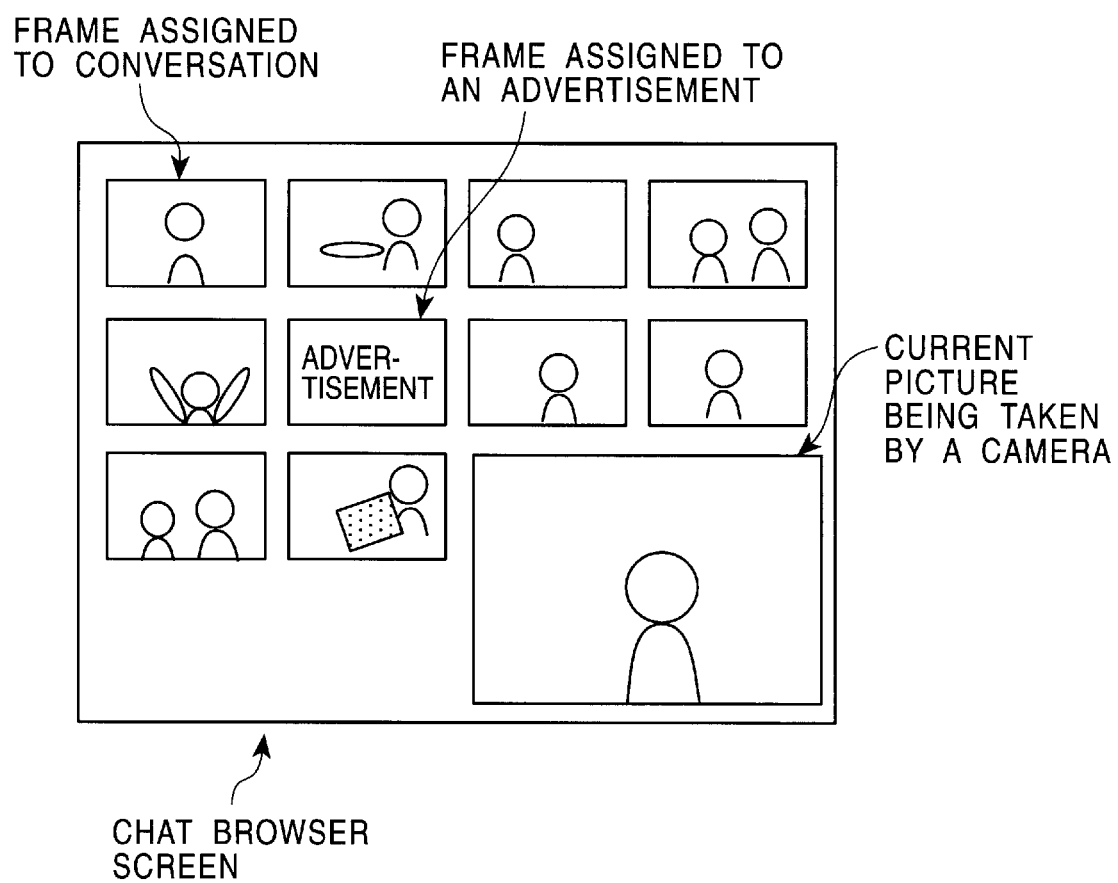
FIG. 14 is a schematic diagram illustrating a chat browser screen on which a frame such as an advertisement is also displayed in addition to chat frames.

It is not necessary to use all frames on the chat browser screen. That is, it is not necessary to display messages or communication data in all frames. For example, as shown in FIG. 14, frames at equal or unequal intervals of locations may be used for a purpose, such as an advertisement, other than the chat (other than the communication data).

For example, a timer is set and an advertisement frame is displayed each time the timer expires, or an advertisement frame is displayed when a pause occurs during a chat. A pause often occurs during a chat, and an advertisement frame allows a user to visually recognize the occurrence of a pause.

A fee for an advertisement may be collected depending upon the number of times the advertisement are displayed, to obtain an income some of which may be used to operate the chat system 3.

A plurality of advertisement media may be prepared in advance, and an arbitrary one of them may be selected and displayed. Alternatively, advertisement media having a close relation to the context of the chat may be selected by tracking the history of the chat or by analyzing the input sentences, and the selected advertisement media may be displayed.

3. Producing a Collection of Messages Together with Pictures

The present inventors propose herein a technique of producing a collection of messages with pictures using communication data according to the invention.

In a conventional collection of messages, ones write messages on one sheet of paper. In the present embodiment, instead of writing messages on paper with a pen, a plurality of communication data are collected into the form of a digital content. Because a collection of messages with pictures according to the present embodiment includes actually photographed pictures of individuals, realistic face expressions and feelings can be represented. Pictures may be switched with particular timings so as to represent a motion such as a gesture or a performance.

A collection of messages with pictures may be edited using the communication data producing system 1 shown in FIG. 1 or using a handy camera designed for use dedicated to editing of collections of messages with pictures.

Figure 15A:
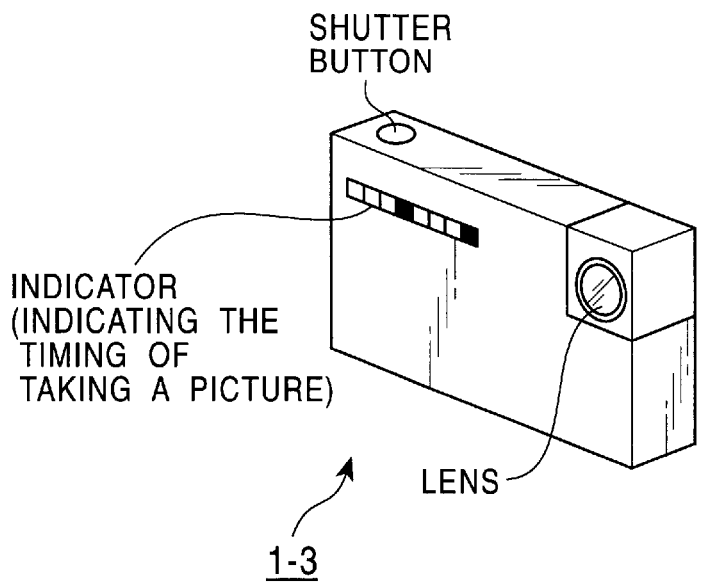
FIG. 15 is a schematic diagram illustrating the front-side appearance and the back-side appearance of a handy camera for producing a collection of messages with pictures.
Figure 15B:
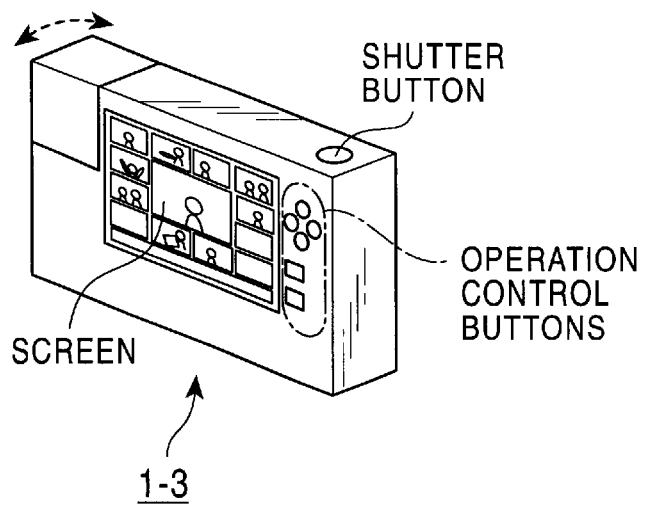

FIG. 15 illustrates the outer appearance of the front side of a handy camera 1-3 for producing pictures used in a collection of messages with pictures and the appearance of the back side thereof.

The handy camera 1-3 has an imaging lens disposed at upper right corner on the front side. The imaging lens may be disposed such that it can be turned over so that not only a subject in front of an operator of the camera 1-3 but also the operator himself/herself can be photographed.

A photographing timing indicator is disposed on the front side. In response to the timing indicated by the indicator, the user can form a desired expression on his/her face or can make a gesture or performance.

A set of operation control buttons and a screen are disposed on the back side of the camera 1-3. The user can see, on the screen, an image to be taken and also can see a set of pictures which have been photographed and collected.

Figure 17:
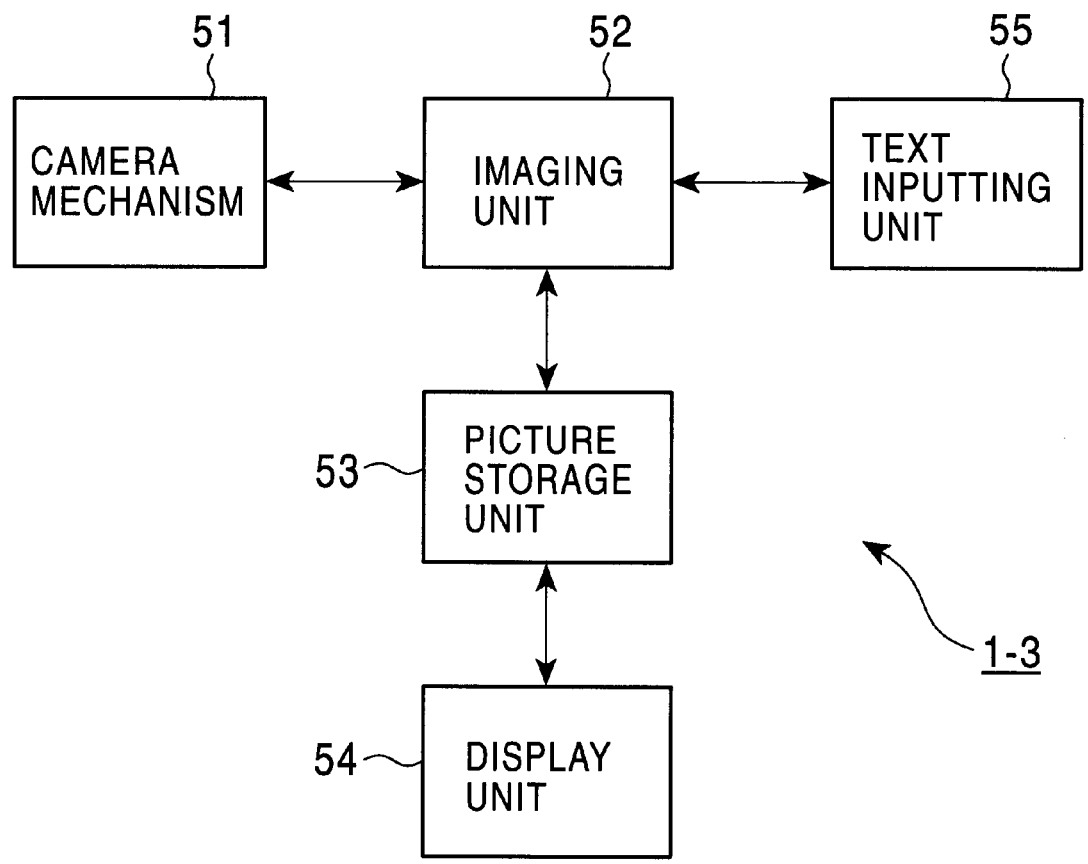
FIG. 17 is a schematic diagram illustrating an internal structure of the camera.

FIG. 17 schematically illustrates an internal structure of the camera 1-3. As shown in FIG. 17, the camera 1-3 includes, in addition to a camera mechanism 51 including a lens and a case, an imaging unit 52, a picture storage unit 53, a display unit 54, and a text inputting unit 55.

The imaging unit 52 includes a CCD sensor and a shutter button. The imaging unit 52 captures a picture in response to pressing of the shutter button. Photographed pictures are stored in the picture storage unit 53. Note that a set of text data and a plurality of pictures taken in one photographing operation is stored in one of formats: format 0 to format 5.

The text inputting unit 55 includes operation control buttons, a pen inputting area (described later) disposed on the display screen, and an external keyboard (not shown) connected to the main body of the camera 1-3. An input sentence is combined with a plurality of pictures captured at a time close to the time at which the sentence was input and stored in the picture storage unit 53.

The display unit 54 is formed of a display device such as a liquid crystal device (LCD) which has a small thickness and a light weight and which needs low power consumption. It is desirable that the display unit 54 have a bit map displaying capability and have a sufficiently high resolution to display a plurality of frames at the same time.

Figure 16:
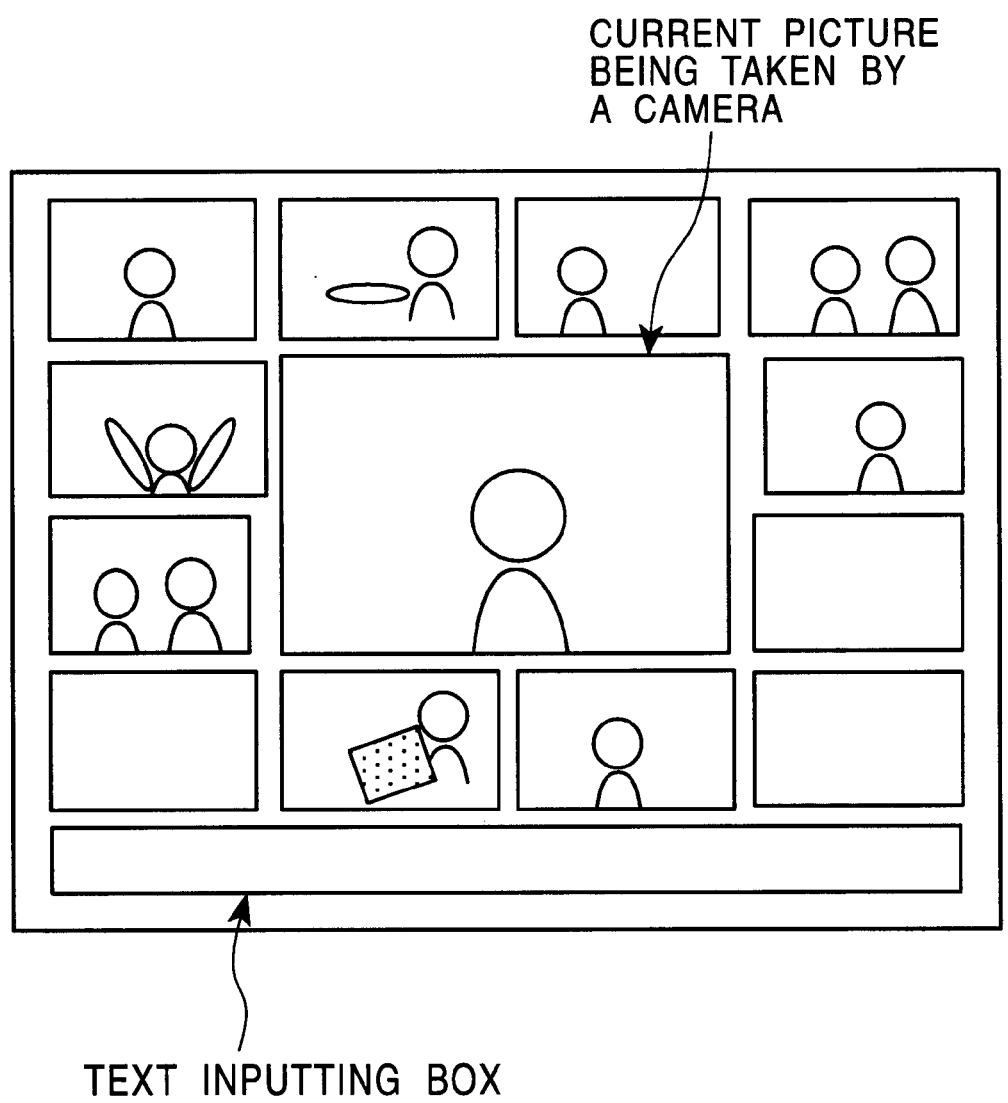
FIG. 16 is a schematic diagram illustrating an example of a collection of pictures according to an embodiment of the present invention.

FIG. 16 schematically illustrates an example of a collection of pictures according to the present embodiment. In this specific example, a current image which is monitored via the lens of the camera 1-3 is displayed in a frame at the center of the screen, and a set of pictures which have been photographed are displayed in frames arranged around the central frame. Although not shown in FIG. 16, each frame includes a message input by a corresponding contributor. A message may be input via operation control buttons disposed on the back side of the camera 1-3 or may be input using a pen into a text inputting box disposed at the bottom of the screen. A message may also be input via the external keyboard (not shown) connected to the camera 1-3.

A collection of messages with pictures edited in the above-described manner may be written on a portable medium such as a floppy disk or a CD and may be presented as, for example, a parting gift.

4. Producing Thumbnails of a Video Picture

The present inventors propose herein a technique of producing thumbnails of a video picture such as that of a broadcast program. Basically, a telop in a broadcast program is automatically detected, and a plurality of frames within a particular period centered at the time at which the telop was detected are captured and displayed in a layout as shown in FIG. 16. In this case, a string of characters displayed in the telop may be treated as an input sentence.

Figure 18:
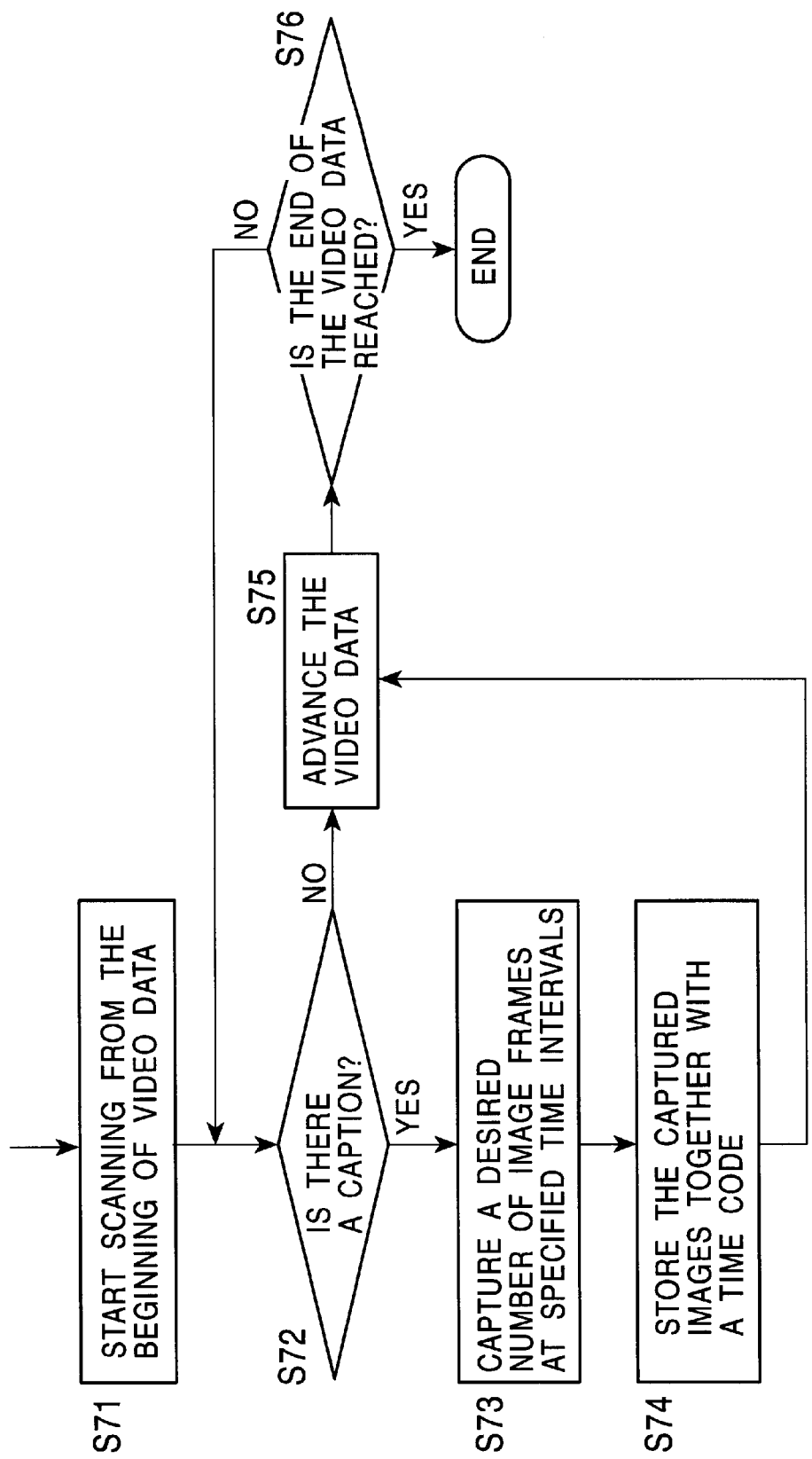
FIG. 18 is a flow chart illustrating a process of producing a video thumbnail picture.

FIG. 18 illustrates, in the form of a flow chart, a process of producing thumbnails of a video picture. The process is described below referring to FIG. 18.

First, video data is scanned from its beginning (step S71) to detect a telop from a broadcast program picture (step S72).

In the case of a DVD (Digital Versatile Disc) content, data representing a caption or telop is stored separately from picture data, and thus it is easy to detect the location where the telop appears. In the case where a telop is superimposed on a video image, the telop can be automatically detected by means of image recognition as follows.

EXAMPLE 1.

A high-brightness area at the bottom of a frame or an area having a specified color is extracted. If the extracted area has a size greater than a threshold, the extracted area is regarded as including a telop.

EXAMPLE 2.

A high-brightness area at the bottom of a frame or an area having a specified color is extracted. OCR (Optical Character Recognition) is performed upon the extracted area. If a string of characters is detected, it is determined that a telop appears.

By employing one of techniques described in Examples 1 and 2, it is possible to detect a telop in a cut. Of course, a telop may be manually detected.

In the case where no caption is detected, the process goes to step S75 to advance the video data. If the end of the video data has been reached, the present routine is ended. However, there is a remaining part in the video data, the routine returns to step S72 to repeat the process described above (step S76).

After that, two (or a specified number of) still pictures separated by a specified period (1 sec, for example) at frame positions near the frame position at which the telop was detected are extracted from the video data (step S73).

In the case where the telop data is written separately from the picture data, a set of the telop data, a plurality of extracted pictures corresponding to the telop, and the associated time code is stored (step S74). In the case where the telop is embedded in the picture, the picture is simply stored.

After that, the process goes to step S75 to advance the video data. If the end of the video data has been reached, the present routine is ended. However, there is a remaining part in the video data, the routine returns to step S72 to repeat the process described above (step S76).

The data extracted via the routine described above consists of a string of characters and a plurality of corresponding pictures, like the communication data. Therefore, the extracted data can be displayed in the form of a set of thumbnails on the chat browser such as that shown in FIG. 12. Because the number of frames which can be displayed on the single browser is limited, pictures displayed in the respective frames may be switched so that prior or subsequent pictures are displayed.

While the present invention has been described above in detail with reference to specific embodiments, it will be obvious to those skilled in the art that various modifications and substitutions may be made without departing from the spirit and scope of the present invention. That is, the embodiments have been descried above by way of example only and not limitation, and it should be understood that the scope of the invention is indicated by the appended claims.

As can be understood from the above description, the present invention provides great advantages. That is, the present invention provides a technique of producing and displaying communication data including an actually-photographed picture of a user.

The present invention also provides a technique of producing and displaying communication data, by which it is possible to attach an actually-photographed picture without having a problem in terms of the data size and without imposing a psychological pressure upon the user.

The present invention also provides a conversation supporting system/method implemented and provided on a computer network such as the Internet, for supporting a virtual conversation such as a chat in which a plurality of users are allowed to participate.

The present invention also provides a conversation supporting system/method for supporting a remote conversation in which actually photographed pictures of respective users are provided without encountering a problem of a high load imposed upon the network or without imposing a psychological pressure upon the users.

Notes

Cyber Code

The cyber code is a two-dimensional bar code which consists of a "guide bar area" indicating the presence of a cyber code and a "code pattern area" in which a two-dimensional code pattern is represented. The code pattern area includes cells arranged in the form of an n×m matrix wherein each cell represents one of two levels (black or white) thereby representing identification information. A cyber code can be detected and decoded as follows. First, a photographed picture is converted into a two-level image. A candidate for a guide bar is then detected from the two-level image. Corner cells are retrieved on the basis of the location and the orientation of the guide bar. After detecting the guide bar and the corner cells, a bit map pattern is decoded. Finally, an error bit test is performed to confirm that a cyber code is correctly detected from the photographed picture. Thus, identification information or location information can be extracted from the code. A further detailed description can be found, for example, in Japanese Patent Application No. 10-184350 "METHOD AND APPARATUS FOR PROCESSING AN IMAGE AND STORAGE MEDIUM", assigned to the present assignee.

What is claimed is:

1. A communication data producing apparatus for producing communication data including a photographed picture, the communication data producing apparatus comprising:

a sentence inputting unit used by a user to input a sentence;

an imaging unit for taking a picture of the user a plurality of times in a predetermined period of time;

a processing unit for producing communication data including the sentence input via the sentence inputting unit and the plurality of pictures taken by the imaging unit; and a sentence analyzer for analyzing the sentence input via the sentence inputting unit, wherein the sentence analyzer extracts a mark comprising one of an exclamation mark, a guestion mark, a face mark, and an escape sequence from the sentence input via the sentence inputting unit and determines a meaning of the sentence based upon the extracted mark in addition to a result of analysis of one of a word and an expression in the sentence.

2. The communication data producing apparatus according to claim 1, wherein in response to an operation performed by the user to input the sentence via the sentence inputting unit, said processing unit starts taking a plurality of pictures using the imaging unit and produces the communication data.

3. The communication data producing apparatus according to claim 1, further comprising an indicator for indicating to the user a timing of the plurality of pictures taken by the imaging unit.

4. The communication data producing apparatus according to claim 1, further comprising:
an image processing unit for processing one of the plurality of pictures taken by the imaging unit, in accordance with the result of analysis performed by the sentence analyzer.

5. The communication data producing apparatus according to claim 1, wherein the sentence inputting unit is capable of inputting either of a mark and an escape sequence indicating a meaning of the sentence.

6. The communication data producing apparatus according to claim 1, further comprising a communication unit for transferring produced communication data outside the communication data producing apparatus.

7. The communication data producing apparatus according to claim 1, further comprising a data storage unit for storing produced communication data.

8. A communication data producing apparatus for producing communication data including a photographed picture, the communication data producing apparatus comprising:
a sentence inputting unit used by a user to input a sentence;
an imaging unit for taking a picture of the user a plurality of times in a predetermined period of time;
a processing unit for producing communication data including the sentence input via the sentence inputting unit and the plurality of pictures taken by the imaging unit;
a sentence analyzer for analyzing the sentence input via the sentence inputting unit; and
an image processing unit for processing one of the plurality of pictures taken by the imaging unit, in accordance with the result of analysis performed by the sentence analyzer,
wherein the image processing unit performs modification comprising at least one of a setting of a background; an adjustment of lightness, luminance, and contrast; a superimposing upon a CG image; a conversion by means of synthesis into a sepia color form, an oil painting like form, a watercolor painting like form, or a mosaic form; and a positive to negative reversion upon a picture depending on one of a feeling of the user and a purpose of the sentence detected as a result of the sentence analysis performed by the sentence analyzer.

9. A communication data producing apparatus for producing communication data including a photographed picture, the communication data producing apparatus comprising:
a sentence inputting unit used by a user to input a sentence;
an imaging unit for taking a picture of the user a plurality of times in a predetermined period of time;
a processing unit for producing communication data including the sentence input via the sentence inputting unit and the plurality of pictures taken by the imaging unit;
a user location registration unit for registration of a set of location information and a user identifier for each of a plurality of users; and
a driving unit for moving an imaging area of the imaging unit to a specified location,
wherein in response to an operation performed by the user to input the sentence via the sentence inputting unit the processing unit queries the user location registration unit to acquire location information associated with the user and commands the driving unit to move the imaging area of the imaging unit in accordance with the acquired location information, and the processing unit produces communication data including the sentence input via the sentence inputting unit and the plurality of pictures taken by the imaging unit.

10. The communication data producing apparatus according to claim 9, wherein the user location registration unit is connected to a main unit of the communication data producing apparatus via a network.

11. A communication data producing method for producing communication data including a photographed picture, the method comprising the steps of:
inputting a sentence, the sentence being input by a user;
imaging the user by taking a picture of the user a plurality of times in a predetermined period of time;
producing the communication data, including the sentence input in the sentence inputting step and the plurality of pictures taken in the imaging step;
a user location registration step in which a set of location information and a user identifier is registered for each of a plurality of users; and
a driving step in which an imaging area in the imaging step is moved to a specified location,
wherein in the producing step, in response to an operation performed by the user to input the sentence, location information associated with the user is acquired; the imaging area taken in the imaging step is moved in accordance with the acquired location information; and communication data including the sentence input by the user and the plurality of pictures taken is produced.

12. The communication data producing method according to claim 11, wherein in the producing step, in response to an operation performed by the user to input the sentence, the imaging step is started to take a plurality of pictures and the communication data is produced.

13. The communication data producing method according to claim 11, wherein in the imaging step, timing of the plurality of pictures is indicated to the user.

14. The communication data producing method according to claim 11, further comprising the steps of:
analyzing the sentence input in the sentence inputting step; and
processing the picture taken in the imaging step in accordance with a result of the analysis performed in the sentence analyzing step.

15. The communication data producing method according to claim 11, wherein in the sentence inputting step one of a mark and an escape sequence indicating a meaning of the input sentence is input.

16. The communication data producing method according to claim 11, further comprising a communication step in which produced communication data is transferred outside.

17. The communication data producing method according to claim 11, further comprising a data storing step in which produced communication data is stored.

18. A communication data producing method for producing communication data including a photographed picture, the method comprising the steps of:
inputting a sentence, the sentence being input by a user;
imaging the user by taking a picture of the user a plurality of times in a predetermined period of time;
producing the communication data, including the sentence input in the sentence inputting step and the plurality of pictures taken in the imaging step;

analyzing the sentence input in the sentence inputting step; and processing the picture taken in the imaging step in accordance with a result of the analysis performed in the sentence analyzing step, wherein in the sentence analyzing step, a mark comprising one of an exclamation mark, a question mark, a face mark, and an escape sequence is extracted from the sentence input in the sentence inputting step and a meaning of the sentence is determined based upon the extracted mark in addition to a result of analysis of one of a word and an expression in the input sentence.

19. A communication data producing method for producing communication data including a photographed picture, the method comprising the steps of:

inputting a sentence, the sentence being input by a user;

imaging the user by taking a picture of the user a plurality of times in a predetermined period of time;

producing the communication data, including the sentence input in the sentence inputting step and the plurality of pictures taken in the imaging step;

analyzing the sentence input in the sentence inputting step; and processing the picture taken in the imaging step in accordance with a result of the analysis performed in the sentence analyzing step, wherein the picture processing step performs modification comprising at least one of a setting of a background; an adjustment of lightness, luminance, and contrast; superimposing upon a CG image; conversion by means of synthesis into a sepia color form, an oil painting like form, a watercolor painting like form, or a mosaic form; and positive to negative reversion upon the picture depending one of a feeling of the user and a purpose of the sentence detected as a result of the sentence analysis performed by the sentence analyzer.

* * * * *